United States Patent
Määttänen et al.

(10) Patent No.: US 12,089,175 B2
(45) Date of Patent: Sep. 10, 2024

(54) DETECTION OF NEIGHBORING SATELLITES IN WIRELESS COMMUNICATION SYSTEMS

(71) Applicant: Telefonaktiebolaget LM Ericsson (PUBL), Stockholm (SE)

(72) Inventors: Helka-Liina Määttänen, Helsinki (FI); Henrik Rydén, Solna (SE); Jonas Sedin, Sollentuna (SE); Sebastian Euler, Storvreta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 623 days.

(21) Appl. No.: 17/279,683

(22) PCT Filed: Sep. 24, 2019

(86) PCT No.: PCT/SE2019/050910
§ 371 (c)(1),
(2) Date: Mar. 25, 2021

(87) PCT Pub. No.: WO2020/067973
PCT Pub. Date: Apr. 2, 2020

(65) Prior Publication Data
US 2022/0039039 A1   Feb. 3, 2022

Related U.S. Application Data

(60) Provisional application No. 62/737,654, filed on Sep. 27, 2018.

(51) Int. Cl.
*H04W 56/00* (2009.01)
*H04W 84/06* (2009.01)

(52) U.S. Cl.
CPC ....... *H04W 56/006* (2013.01); *H04W 56/001* (2013.01); *H04W 56/0045* (2013.01); *H04W 84/06* (2013.01)

(58) Field of Classification Search
CPC ............. H04W 56/006; H04W 56/001; H04W 56/0045; H04W 84/06; H04B 7/18541
See application file for complete search history.

(56) References Cited

U.S. PATENT DOCUMENTS

| | | | |
|---|---|---|---|
| 2008/0169979 A1* | 7/2008 | de Salas | G01S 19/03 342/357.46 |
| 2012/0280865 A1* | 11/2012 | Gardner | G01S 5/021 342/463 |

(Continued)

FOREIGN PATENT DOCUMENTS

| | | | | |
|---|---|---|---|---|
| CA | 2894309 A1 * | 10/2010 | .......... | G01S 5/0018 |
| CA | 2894309 C  * | 1/2018  | .......... | G01S 5/0018 |

(Continued)

OTHER PUBLICATIONS

PCT International Preliminary Report on Patentability issued for International application No. PCT/SE2019/050910—Dec. 3, 2020.

(Continued)

*Primary Examiner* — Jay P Patel
*Assistant Examiner* — Shehab A Alawdi
(74) *Attorney, Agent, or Firm* — Baker Botts L.L.P.

(57) ABSTRACT

A method is performed by a wireless device for communication in a non-terrestrial network, NTN, comprising at least a first non-terrestrial network node and a second non-terrestrial network node. The method includes determining an estimated location of the wireless device. The method further includes obtaining first location information associated with the first non-terrestrial network node and second location information associated with the second non-terrestrial network node. The method further includes calculating an estimated signal time arrival difference based on the location of the wireless device, the first location information, and the second location information. The method further includes using the estimated signal time arrival difference to (Continued)

provision an NTN-specific synchronization signal/physical broadcast channel, SS/PBCH, block measurement timing configuration, NTN-SMTC.

21 Claims, 16 Drawing Sheets

(56) References Cited

U.S. PATENT DOCUMENTS

| | | | | |
|---|---|---|---|---|
| 2015/0271730 A1* | 9/2015 | Benammar | ............ | H04B 7/195 |
| | | | | 455/436 |
| 2017/0176599 A1* | 6/2017 | Hay | ........................ | G01S 19/47 |
| 2017/0288769 A1* | 10/2017 | Miller | .................... | H04B 7/212 |
| 2019/0313271 A1* | 10/2019 | Yiu | ........................ | H04W 72/04 |
| 2020/0374958 A1* | 11/2020 | Liu | ........................ | H04W 76/15 |

FOREIGN PATENT DOCUMENTS

| | | |
|---|---|---|
| EP | 2 779 482 A1 | 9/2014 |
| GB | 2 321 831 A | 8/1998 |
| JP | 2001 069058 A | 3/2001 |

OTHER PUBLICATIONS

PCT International Search Report issued for International application No. PCT/SE2019/050910—Jan. 14, 2020.
PCT Written Opinion of the International Searching Authority issued for International application No. PCT/SE2019/050910—Jan. 14, 2020.
3GPP TSG-RAN WG2 Meeting #103, Gothenburg, Sweden, Source: Qualcomm Incorporated; Title: Summary of offline discussion#26 (R2-1813394)—Aug. 20-24, 2018.

* cited by examiner

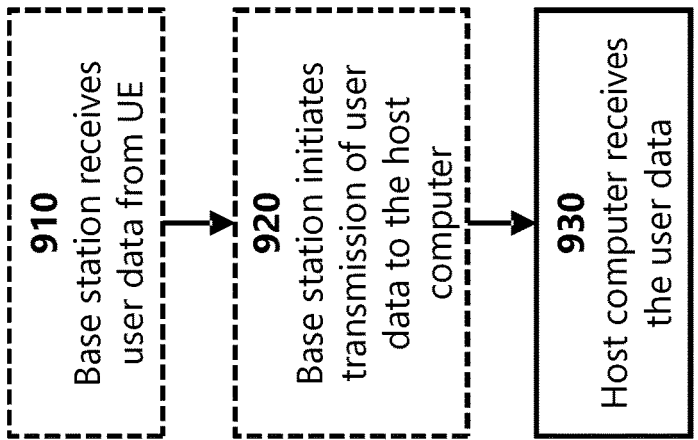
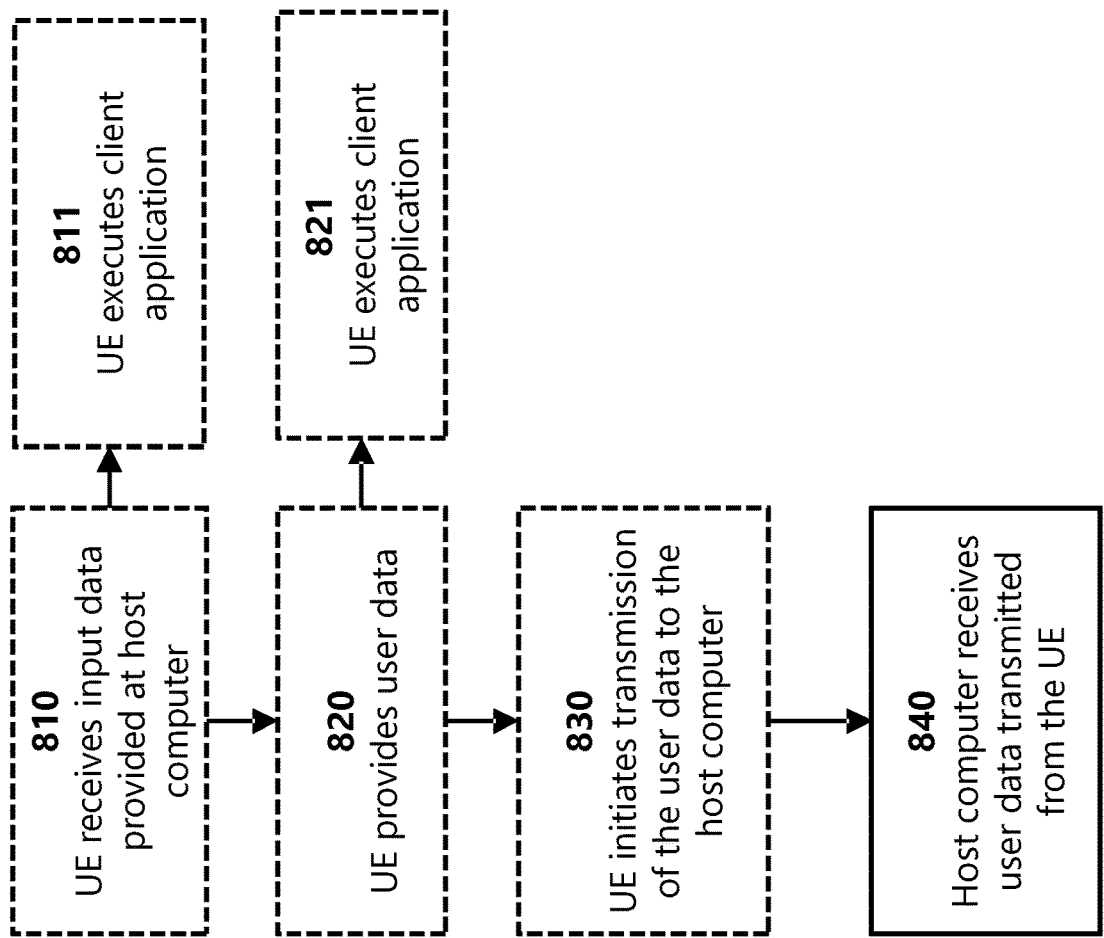

DETECTION OF NEIGHBORING SATELLITES IN WIRELESS COMMUNICATION SYSTEMS

PRIORITY

This nonprovisional application is a U.S. National Stage Filing under 35 U.S.C. § 371 of International Patent Application Serial No. PCT/SE2019/050910 filed Sep. 24, 2019 and entitled "DETECTION OF NEIGHBORING SATELLITES IN WIRELESS COMMUNICATION SYSTEMS" which claims priority to U.S. Provisional Patent Application No. 62/737,654 filed Sep. 27, 2018 both of which are hereby incorporated by reference in their entirety.

TECHNICAL FIELD

Certain embodiments of the present disclosure relate, in general, to wireless communications and, more particularly, to non-terrestrial wireless communications.

BACKGROUND

There is an ongoing resurgence of satellite communications. Several plans for satellite networks have been announced in the past few years. The target services vary from backhaul and fixed wireless, to transportation, to outdoor mobile, to Internet-of-Things (IoT). Satellite networks could complement mobile networks on the ground by providing connectivity to underserved areas and multicast/broadcast services.

To benefit from the strong mobile ecosystem and economy of scale, adapting the terrestrial wireless access technologies, including Long Term Evolution (LTE) and New Radio (NR), for satellite networks is drawing significant interest. For example, the Third Generation Partnership Project (3GPP) completed an initial study in Release 15 on adapting NR to support non-terrestrial networks (mainly satellite networks) (Technical Report TR 38.811). This initial study focused on the channel model for the non-terrestrial networks, defining deployment scenarios, and identifying the key potential impacts. 3GPP is conducting a follow-up study item in Release 16 on solutions evaluation for NR to support non-terrestrial networks (RP-181370)

Satellite Communications

A satellite radio access network (RAN) usually includes the following:

A gateway that connects a satellite network to core network

A satellite, referring to a space-borne platform

A terminal, referring to a terminal wireless device such as a user equipment (UE)

A feeder link, referring to the link between a gateway and a satellite

A service link, referring to the link between a satellite and a terminal

The link from gateway to terminal is often called the forward link, and the link from terminal to gateway is often called the return link or the access link. Depending on the functionality of the satellite in the system, two transponder options can be considered:

Bent pipe transponder: the satellite forwards the received signal back to the earth with only amplification and a shift from uplink frequency to downlink frequency.

Regenerative transponder: the satellite includes on-board processing to demodulate and decode the received signal and regenerate the signal before sending it back to the earth.

Depending on the orbit altitude, a satellite may be categorized as low Earth orbit (LEO), medium Earth orbit (MEO), or geostationary (GEO) satellite.

LEO: typical heights ranging from 250-1,500 km, with orbital periods ranging from 90-130 minutes.

MEO: typical heights ranging from 5,000-25,000 km, with orbital periods ranging from 2-14 hours.

GEO: height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers. FIG. 1 shows an example architecture of a satellite network with bent pipe transponders.

In the 3GPP RAN #80 meeting, a new study item (SI) "Solutions for NR to support Non Terrestrial Network" was agreed (RP-108370). It is a continuation of a preceding SI "NR to support Non-Terrestrial Networks" (RP-171450), where the objective was to study the channel model for the non-terrestrial networks, to define deployment scenarios and parameters, and to identify the key potential impacts on NR. The results are reflected in 3GPP Technical Report 38.811.

The objectives of the current SI are to evaluate solutions for the identified key impacts from the preceding SI and to study impact on radio access network (RAN) protocols/architecture. The objectives for layer 2 and above are:

Study the following aspects and identify related solutions if needed: Propagation delay: Identify timing requirements and solutions on layer 2 aspects, MAC, RLC, RRC, to support non-terrestrial network propagation delays considering FDD and TDD duplexing mode. This includes radio link management. [RAN2]

Handover: Study and identify mobility requirements and necessary measurements that may be needed for handovers between some non-terrestrial space-borne vehicles (such as Non Geo stationary satellites) that move at much higher speed but over predictable paths [RAN2, RAN1]

Architecture: Identify needs for the 5G's Radio Access Network architecture to support non-terrestrial networks (e.g. handling of network identities) [RAN3]

Paging: procedure adaptations in case of moving satellite foot prints or cells Note, the new study item does not address regulatory issues.

The coverage pattern of non-terrestrial network (NTN) is described in TR 38.811 in Section 4.6 as follows:

Satellite or aerial vehicles typically generate several beams over a given area. The foot print of the beams are typically elliptic shape.

The beam footprint may be moving over the earth with the satellite or the aerial vehicle motion on its orbit. Alternatively, the beam foot print may be earth fixed, in such case some beam pointing mechanisms (mechanical or electronic steering feature) will compensate for the satellite or the aerial vehicle motion.

TABLE 4.6-1

| | Typical beam footprint size | | |
|---|---|---|---|
| Attributes | GEO | Non-GEO | Aerial |
| Beam foot print size in diameter | 200-1000 km | 100-500 km | 5-200 km |

Typical beam patterns of various NTN access networks are depicted in Figure 4.6-1 of TR 38.811, as reproduced herein as FIG. 2.

The Technical Report of the ongoing Study Item, TR 38.821, describes scenarios for the NTN work as follows:

Non-Terrestrial Network typically features the following elements:
- One or several sat-gateways that connect the Non-Terrestrial Network to a public data network
- a GEO satellite is fed by one or several sat-gateways which are deployed across the satellite targeted coverage (e.g. regional or even continental coverage). We assume that UE in a cell are served by only one sat-gateway
- A Non-GEO satellite served successively by one sat-gateway at a time. The system ensures service and feeder link continuity between the successive serving sat-gateways with sufficient time duration to proceed with mobility anchoring and hand-over

SUMMARY

There currently exist certain challenges. One of the objectives in the satellite study item is to study the handover procedure (HO). In a non-geosynchronous scenario, it is expected that the number of handovers will be large due to the fast movement of the satellites—a LEO satellite with an orbital period of 90 minutes might be visible (above the horizon) from a certain point on the Earth for only 10 minutes. Due to the large propagation delay, the arrival time of the signal of the target satellite can be very different in comparison to the serving satellite. This may interfere with the handover procedure and potentially lead to failed handovers and/or radio link failures.

Certain aspects of the present disclosure and their embodiments may provide solutions to these or other challenges. For example, certain embodiments may allow for the estimation and communication of the expected signal arrival time difference between a serving and neighbouring cell, thereby enabling efficient detection of a neighbouring cell in satellite handovers. Certain embodiments allow the network, e.g., via one or more network nodes, to estimate an expected signal time arrival distance (ESTAD) that may be used in processing the target satellite signals. Also, certain embodiments allow a wireless device, such as a UE, to make an ESTAD estimation. In certain embodiments, this adjustment information can then be used for setting the SS/PBCH Block Measurement Time Configuration (SMTC), as descried herein.

According to an embodiment, a method is performed by a wireless device for communication in an NTN comprising at least a first non-terrestrial network node and a second non-terrestrial network node. The method includes determining an estimated location of the wireless device. The method further includes obtaining first location information associated with the first non-terrestrial network node and second location information associated with the second non-terrestrial network node. The method further includes calculating an estimated signal time arrival difference based on the location of the wireless device, the first location information, and the second location information. The method further includes using the estimated signal time arrival difference to provision an NTN-specific synchronization signal/physical broadcast channel (SS/PBCH) block measurement timing configuration (NTN-SMTC).

According to another embodiment, a computer program product includes a non-transitory computer readable medium storing computer readable program code. The computer readable program code comprises program code operable to perform the above method.

According to yet another embodiment, a wireless device is disclosed for use in an NTN comprising at least a first non-terrestrial network node and a second non-terrestrial network node. The wireless device comprises a memory configured to store instructions and processing circuitry configured to execute the instructions. The wireless device is configured to determine an estimated location of the wireless device. The wireless device is further configured to obtain first location information associated with the first non-terrestrial network node and second location information associated with the second non-terrestrial network node. The wireless device is further configured to calculate an estimated signal time arrival difference based on the location of the wireless device, the first location information, and the second location information. The wireless device is further configured to use the estimated signal time arrival difference to provision an NTN-SMTC.

In certain embodiments, the method/wireless device/computer program product may have one or more additional and/or optional features, such as one or more of the following:

In particular embodiments, the method/wireless device/computer program product further includes using the NTN-SMTC to detect one of the first non-terrestrial network node and second non-terrestrial network node.

In particular embodiments, calculating the estimated signal time arrival difference includes determining a first propagation time between the first non-terrestrial network node and the wireless device using the location of the wireless device and the first location information. Calculating the estimated signal time arrival difference further includes determining a second propagation time between the second non-terrestrial network node and the wireless device using the location of the wireless device and the second location. Calculating the estimated signal time arrival difference further includes using the first propagation time and the second propagation time to calculate the estimated signal time arrival difference.

In particular embodiments, calculating the estimated signal time arrival difference includes obtaining a third propagation time between the first non-terrestrial network node and a first gateway through which the first non-terrestrial network node communicates with a core network. Calculating the estimated signal time arrival difference further includes obtaining a fourth propagation time between the second non-terrestrial network node and a second gateway through which the second non-terrestrial network node communicates with the core network. Calculating the estimated signal time arrival difference further includes using the third propagation time and the fourth propagation time to calculate the estimated signal time arrival difference.

In particular embodiments, at least one of the first non-terrestrial network node and the second non-terrestrial network node is operated in a bent-pipe mode.

In particular embodiments, the method/wireless device/ computer program product further includes receiving one or more satellite reference signals using the NTN-SMTC.

In particular embodiments, the method/wireless device/ computer program product further includes participating in a handover procedure from the first non-terrestrial network node to the second non-terrestrial network node using the NTN-SMTC.

In particular embodiments, at least one of the first non-terrestrial network node and the second non-terrestrial network node is a low-earth orbiting satellite, a medium-earth orbiting satellite, or a geostationary satellite.

In particular embodiments, obtaining the first location information and the second location information comprises obtaining trajectory information associated with the first non-terrestrial network node and the second non-terrestrial network node.

In particular embodiments, determining a location of the wireless device comprises determining the location of the wireless device using a global navigation satellite system.

In particular embodiments, the method/wireless device/ computer program product further includes indicating to the NTN that the wireless device is capable of calculating the estimated signal time arrival difference.

According to an embodiment, a method is performed by a first non-terrestrial network node for communication in an NTN comprising at least the first non-terrestrial network node and a second non-terrestrial network node. The method includes obtaining location information associated with a wireless device. The method further includes obtaining first location information associated with the first non-terrestrial network node and second location information associated with the second non-terrestrial network node. The method further includes calculating an estimated signal time arrival difference based on the location information associated with the wireless device, the first location information, and the second location information. The method further includes providing an NTN-SMTC to the wireless device.

According to another embodiment, a computer program product includes a non-transitory computer readable medium storing computer readable program code. The computer readable program code comprises program code operable to perform the method immediately above.

According to another embodiment, a first non-terrestrial network node is disclosed for use in an NTN comprising at least the first non-terrestrial network node and a second non-terrestrial network node. The first non-terrestrial network node comprises a memory configured to store instructions and processing circuitry configured to execute the instructions. The first non-terrestrial network node is configured to obtain location information associated with a wireless device. The first non-terrestrial network node is further configured to obtain first location information associated with the first non-terrestrial network node and second location information associated with the second non-terrestrial network node. The first non-terrestrial network node is further configured to calculate an estimated signal time arrival difference based on the location information associated with the wireless device, the first location information, and the second location information. The first non-terrestrial network node is further configured to provide an NTN-SMTC to the wireless device.

In certain embodiments, the method/network node/computer program product may have one or more additional and/or optional features, such as one or more of the following:

In particular embodiments, the method/network node/ computer program product further includes signaling the estimated signal time arrival difference to the wireless device. In particular embodiments, the method/network node/computer program product further includes receiving, from the wireless device, a request for the NTN-SMTC. The request is signaled in response to the estimated signal time arrival difference exceeding a predetermined threshold. Providing the NTN-SMTC is in response to receiving the request from the wireless device.

In particular embodiments, the NTN-SMTC is used to detect one of the first non-terrestrial network node and the second non-terrestrial network node.

In particular embodiments, the method/network node/ computer program product further includes determining a first propagation time between the non-terrestrial first network node and the wireless device using the location of the wireless device and the first location information. Further, determining a second propagation time between the second non-terrestrial network node and the wireless device using the location of the wireless device and the second location information. Further, using the first propagation time and the second propagation time to calculate the estimated signal time arrival difference.

In particular embodiments, the method/network node/ computer program product further includes obtaining a third propagation time between the first non-terrestrial network node and a first gateway through which the first non-terrestrial network node communicates with a core network. Further, obtaining a fourth propagation time between the second non-terrestrial network node and a second gateway through which the second non-terrestrial network node communicates with the core network. Further, using the third propagation time and the fourth propagation time to calculate the estimated signal time arrival difference.

In particular embodiments, at least one of the first non-terrestrial network node and the second non-terrestrial network node is operated in a bent-pipe mode.

In particular embodiments, the NTN-SMTC enables the wireless device to receive one or more satellite reference signals.

In particular embodiments, the method/network node/ computer program product further includes participating in a procedure to handover the wireless device from the first non-terrestrial network node to the second non-terrestrial network node using the NTN-SMTC.

In particular embodiments, at least one of the first non-terrestrial network node and the second non-terrestrial network node is a low-earth orbiting satellite, a medium-earth orbiting satellite, or a geostationary satellite.

In particular embodiments, obtaining first location information and second location information comprises obtaining trajectory information associated with the first non-terrestrial network node and the second non-terrestrial network node.

In particular embodiments, the first non-terrestrial network node and the second non-terrestrial network node are operated in a regenerative mode. The estimated signal time arrival difference is further based on the synchronization between the first non-terrestrial network node and the second non-terrestrial network node.

Certain embodiments may provide one or more of the following technical advantages. For example, certain embodiments allow the efficient monitoring of neighbouring cells, e.g., in the handover procedure. Certain embodiments enable the efficient monitoring of neighbouring cells in non-terrestrial networks, including satellite networks, where the cell coverage area may be large. As another example, certain embodiments allow for the provision of an NTN-SMTC based on the estimated/expected signal time arrival difference, thereby allowing the monitoring of a neighbour satellite in an appropriate window of time. Certain embodiments may have one or more of the technical advantages. Certain embodiments may have none, some, or all of the above-recited advantages. Other advantages may be readily apparent to one having skill in the art.

BRIEF DESCRIPTION OF THE DRAWINGS

For a more complete understanding of the disclosed embodiments and their features and advantages, reference is now made to the following description, taking in conjunction with the accompanying drawings, in which:

FIG. 11 is a flowchart illustrating an example method implemented in a communication system, in accordance with certain embodiments;

FIG. 12 is a flowchart illustrating an example method implemented in a communication system, in accordance with certain embodiments;

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Figure 1:
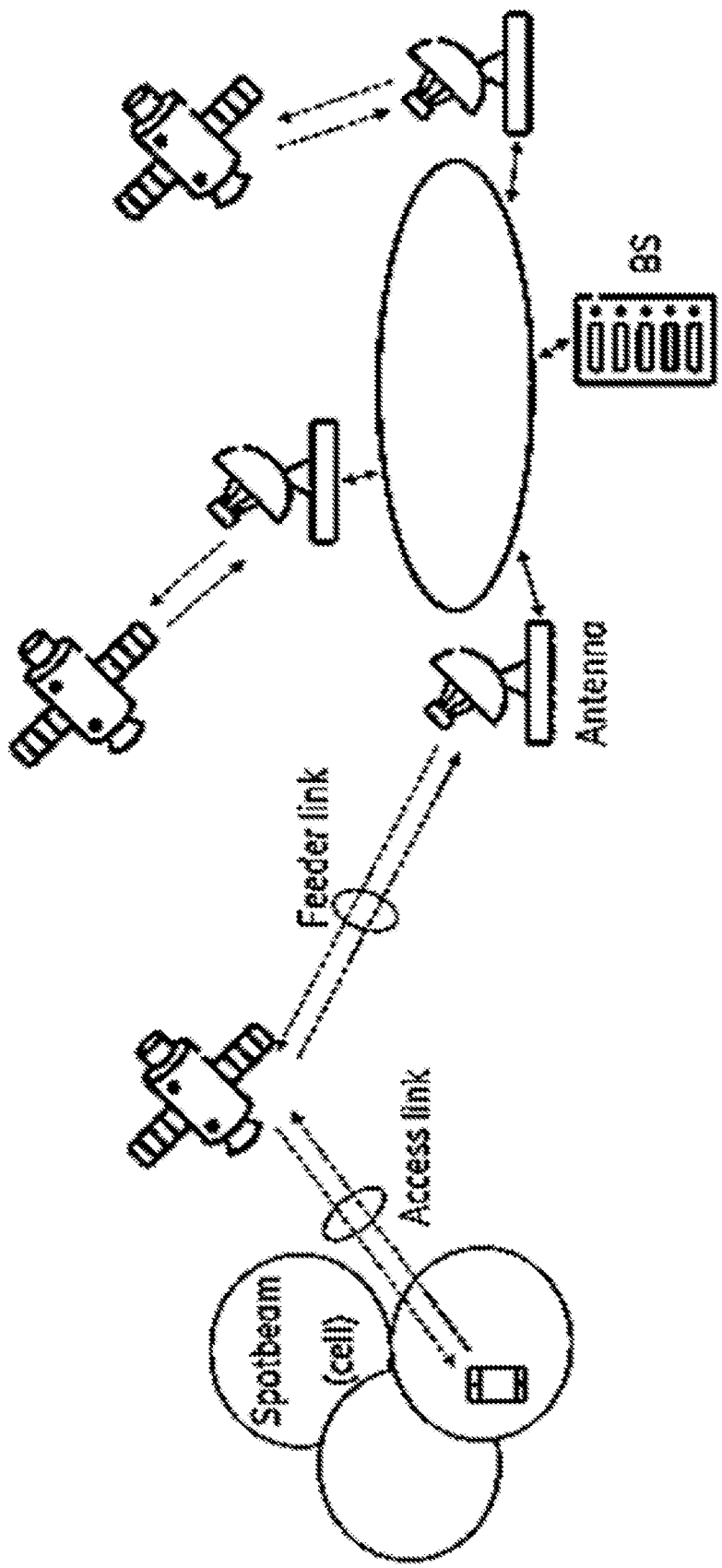
FIG. 1 illustrates an non-terrestrial wireless communications network, in accordance with certain embodiments.
Figure 2:
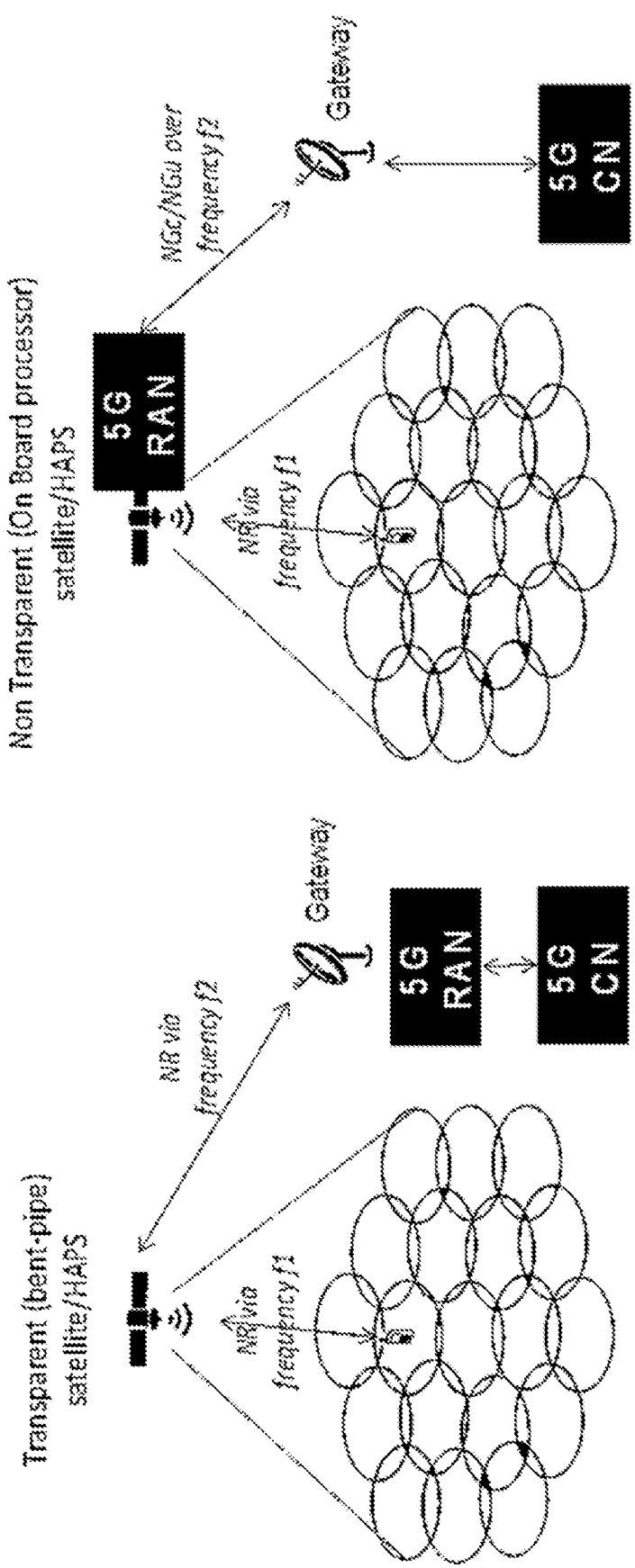
FIG. 2 illustrates a pair of non-terrestrial network configurations, in accordance with certain embodiments.
Figure 3:
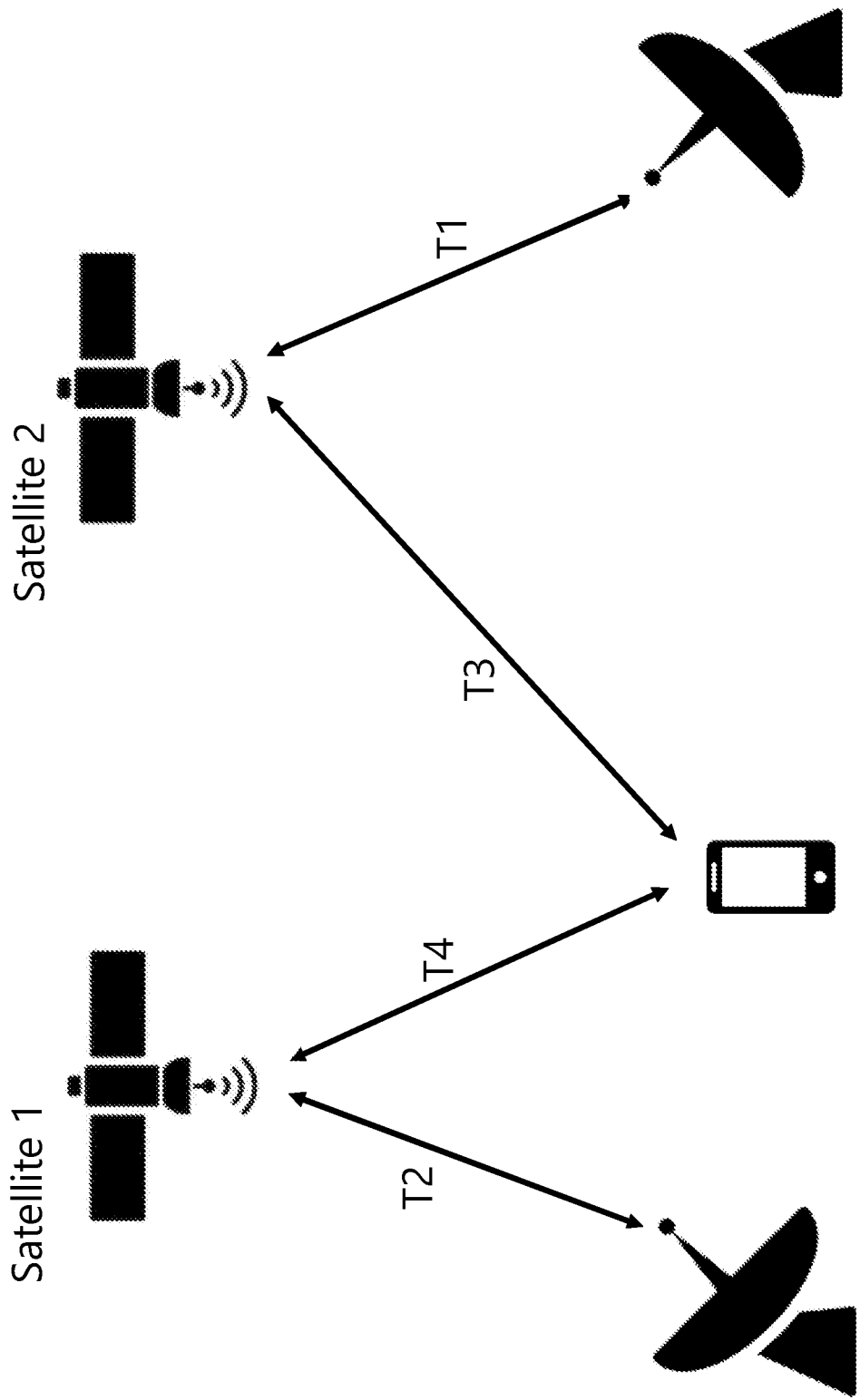
FIG. 3 illustrates example signalling delays for communicating via two different satellites, in accordance with certain embodiments.

As described above, the handover procedure and other procedures involving the measurement or detection of neighbouring satellite network nodes may face problems with the large number of handovers caused by the fast movement of the satellites. Indeed, measurements are also used to assist the HO decision. Additionally, Self-Organizing Networks (SON) types of measurements are used for Automatic Neighbour Relation (ANR), to inform the network of where the interfaces X2 and/or Xn should be set up. Due to the large propagation delay, the arrival time of the signal of the target satellite can be very different in comparison to the serving satellite. An example configuration showing the difference in delay between two satellites is shown in FIG. 3. In FIG. 3, the time delay for communicating with Satellite 1 is the sum of times T2 and T4, whereas the time delay for communicating with Satellite 2 is the sum of times T3 and T1. This time delay/propagation difference may require additional or modified techniques at the network nodes serving or wireless device or those to which the wireless device is being switch over. Additionally, new techniques may be implemented by the wireless device in order to handle the challenging environment of a non-terrestrial network involving non-geosynchronous satellites.

In terrestrial New Radio (NR) or Long-term Evolution (LTE) wireless communications, the distances between the user equipment (UE) and the next generation NodeB (gNB) are on the order of hundreds of meters. In contrast, communication with satellites covers distances on the order of hundreds of kilometers. This creates further timing related challenges for using NR/LTE for satellite communication.

In particular, in NR, the reference signal used by the UE to detect neighbour cells is sent from different cells in bursts called SS-Burst (e.g., see 3GPP Technical Report 38.312) with periodicity that may range from 5 ms to 160 ms. For the wireless device, e.g., the UE, to be able to measure a cell on a frequency efficiently, the network provides assisting information to the UE in a measurement object. The assisting information comprises an SS/PBCH Block Measurement Time Configuration (SMTC) which may operate as a time window in which to search for cells on a frequency and periodicity+offset to know when the time window is valid. The UE may be given one SMTC per frequency. Additionally, for intra-frequency measurements, UE may be given an additional SMTC (SMTC2) with a cell list to provide specific SMTC information. SMTC2 is defined, however to have the same offset as the frequency specific SMTC (called SMTC1) and to be tied to the cell list. This creates challenges when having to complete handover procedures more frequently with relatively larger propagation delays in satellite communication.

According to certain embodiments, the search window for neighbouring cell detection may be adjusted for detecting transmissions from another satellite. For example, the search window may be adjusted for detecting neighbouring Satellite 1 for the wireless device to switch over from Satellite 2, such as in the illustrated example of FIG. 3. According to a first set of embodiments, the network estimates the expected signal time arrival difference (ESTAD). In a second set of embodiments, the wireless device, e.g., the UE, makes the estimation of the ESTAD. In some embodiments, this adjustment information may be used for adjusting the search window, e.g., the ESTAD may be used for configuring a search window of an SMTC or providing a non-terrestrial network (NTN) SMTC, as described in detail below.

Network-Based Estimation

In certain embodiments, the network may estimate the ESTAD. As an initial matter, the network, e.g., a network node/base station, may obtain location information for the wireless device. For example, the network may estimate the location of the UE, e.g., based on signalled information from the UE or based on measurements made by the network towards the UE, or receive the location of the UE, e.g., from the UE itself or from another source such as a serving network node.

The network may also obtain or estimate propagation delay information for communication between the UE and the respective satellites (e.g., the times T3 and T4 between the UE and Satellite 1 and Satellite 2, respectively, as shown in FIG. 3). In some embodiments, the network may estimate the propagation delay information based on the location information of the UE. For example, the network may estimate the delay information based on the known or estimated distances between the UE and the respective satellites. The network may also calculate propagation delay information between the network gateways and respective satellites (e.g., T1 and T2 between gateways and Satellite 1 and Satellite 2, respectively, as shown in FIG. 3). In some embodiments, the satellites are configured in a bent-pipe configuration. In such a configuration, the network may calculate the propagation delay information between the network gateways and respective satellites using the gateway locations and satellite trajectories.

In certain embodiments, using the propagation delay information, the network may estimate the expected signal time arrival different (ESTAD). In some embodiments, the network may also estimate an associated uncertainty of the difference in time/delay between the serving and neighbouring cells.

In certain embodiments, after estimating the ESTAD, the network may signal the ESTAD to the UE. In some embodiments, the network may also signal an associated uncertainty between the serving and neighbouring cells with the ESTAD. The UE may process target satellite signals using the received ESTAD (and optionally the associated uncertainty if so provided).

In a particular embodiment, the network-based estimation includes the following steps:
  110: Estimate or receive the UE location.
  120: Estimate T3, T4 (see FIG. 3) based on step 110 (and obtained positions of the satellites)
  130: Calculate T1, T2 using gateway locations and satellite trajectories if using bent-pipe mode (e.g., the satellites merely relay the signals with power adjustments)
  140: Estimate the Expected Signal Time Arrival Difference (ESTAD) (optionally an associated uncertainty between the serving and neighbouring cell)
  150: Signal the ESTAD difference (optionally including an estimation uncertainty) to the UE
  160: *At UE device*. Process target satellite signals using received ESTAD and optional uncertainty.

As shown in this particular example, the network may estimate the ESTAD for a wireless device in relation to two satellites (e.g., a serving satellite and a target/neighbouring satellite). The wireless device may use this information to process signals from the target/neighbouring satellite, e.g., as part of a handover procedure or other procedure requiring the measurement/detection of target network node signals.

UE-Based Estimation (ESTAD Calculated at the UE Side)

In certain embodiments, the wireless device may estimate the ESTAD. For example, the wireless device may estimate its own location, e.g., via the Global Navigation Satellite System (GNSS) or by other location-determining means. The wireless device may also obtain the serving and target satellite trajectories. For example, the wireless device may obtain the trajectories itself directly from communicable satellites and/or by another component of the network. In some embodiments, the satellites are operated in a bent-pipe mode. In such cases, the wireless device may also receive gateway locations.

Using the location information, the wireless device may calculate the ESTAD. For example, the wireless device may estimate propagation delays T1, T2, T3, and T4 as discussed above, in estimating the ESTAD. In certain embodiments, the wireless device may use the estimated ESTAD to receive signals from the satellite. For example, the wireless device may use the ESTAD to provision a particular SMTC to enable the receipt of satellite reference signals.

In a particular embodiment, the wireless device-based estimation includes the following steps:
  200: Estimate the wireless device's location (e.g., using GNSS)
  210: Receive serving and target satellite trajectories
  220: Optionally receive gateway location(s) if operating in bent-pipe mode
  230: Calculate ESTAD
  240: Receive target satellite reference signals using ESTAD Provision of NTN Specific SMTC According to certain embodiments, the wireless device may receive a modified or new SMTC that can be used to better detect and monitor signals involving fast-moving satellites. In particular, for non-terrestrial networks (NTN), the network may provide the UE with an NTN-specific SMTC in addition to or instead of the terrestrial SMTCs (e.g., SMTC1 and SMTC2 as described above). In certain embodiments, the modified SMTC or new SMTC_NTN may include different parameter values as compared to the terrestrial SMTCs.

In certain embodiments, the SMTC_NTN is provided to assist radio resource management (RRM) measurement in a network where a potential target cell is known. For example, in satellites there may be smaller list of potential target cells due to huge coverage area of one cell. In some embodiments, the SMTC_NTN includes a different offset than the SMTC1. The offset may be based on ESTAD or other location information of the satellites and/or gateways. In some embodiments, multiple, different SMTC NTNs may be provided with known cell ID (e.g., Physical Cell Identity (PCI)). In this manner, each SMTC_NTN may be tailored to the particular cell ID, which may capture the specifics of the trajectory of the satellite in relation to the position and/or movement of the wireless device.

In certain embodiments, the SMTC_NTN is provided to assist in Self-Organizing Networks (SON) types of measurements, e.g., those used for Automatic Neighbour Relation (ANR) to inform the network of where the network interfaces should be set up. In some embodiments, the SMTC_NTN may be provided without a cell list, thereby allowing the UE to find new cells within that SMTC_NTN.

Accordingly, the SMTC_NTN may be provided more flexibility to address the increased propagation delays for NTN communication and frequent handover and SON procedures.

Additional details regarding certain techniques and steps described in certain embodiments above are provided below.

UE Location Estimation

In certain embodiments, the UE can estimate its location, e.g., using GNSS. In some embodiments, this location can be signaled to the network via the NR-positioning protocol (NR-PP). The network can use this location to calculate the propagation delay to the UE (e.g., T3, T4). In certain embodiments, the location can also be estimated at the network side using terrestrial cellular method such as Enhanced cell id or observed time difference of arrival (OTDOA). In some embodiments, the network may have limited or no UE location knowledge. In such cases, in some embodiments, the network may then base its estimation of T3, T4 on the delay towards the center location of its satellite beam.

Satellite Trajectories

In certain embodiments, the network can calculate the time duration T1/T2 based on the location of the gateway and the satellite. In some embodiments, a regenerative mode is used, and accordingly, the signal time arrival may depend on the T3, T4 and the synchronization between satellite 1 and 2. The network may use that information to calculate the time durations between the gateway(s) and the satellites.

Network Estimate of ESTAD

In certain embodiments, based on the estimate of the T1-T4, the network can estimate the ESTAD, e.g., as described above. In certain embodiments, the network also includes synchronization information between satellites in the ESTAD estimate.

Signaling and ESTAD Uncertainty

In certain embodiments, the network signals the ESTAD, optionally including an uncertainty. For example, the uncertainty may be larger if the UE location is less precise or unknown. In some embodiments, the ESTAD can be signaled as one value, or, in some embodiments, it may be signaled as a function that details how the signal arrival time difference changes over time or with different inputs. In some embodiments, the ESTAD may be signaled after handover when the monitoring of a new cell starts, or when a handover is likely due to low serving signal quality or at any other time.

UE-Based Methods

In certain embodiments, the UE calculates the ESTAD and the UE obtains information to calculate the relevant time durations, e.g., T1-T4. In some embodiments, the UE receives the serving and satellite trajectories via unicast signaling. In some embodiments, the UE receives the trajectories via broadcasted signaling, e.g., in the system information block (SIB). When bent-pipe mode is used, the UE may also be signaled with the gateway location, thereby allowing it to estimate T1 and T2. In case the UE is unable to determine its own position, the UE may also obtain its position information with the center location of the satellite beam, or another location estimation.

In certain embodiments, prior to selecting what mode the network should operate in, the network can signal a capability request if UE supports estimating the ESTAD at the UE or if the network estimates the ESTAD. In this manner, the network may determine a configuration of the network or the UE to accommodate the potentially varied capabilities of the wireless devices served by the non-terrestrial network and ensure the ESTAD is determined by a capable device.

In certain embodiments, the UE is not mandated to listen for other cells until the ESTAD is signaled. The signaling to start listening for other cells can also include other information such as speed and doppler pre-compensating factors. In this manner, the wireless device need not waste power for listening to other cells without knowing the delay. In a similar manner, the wireless device, in some embodiments, does not attempt to listen or make measurements on other cells before receiving the SMTC_NTN.

Figure 4:
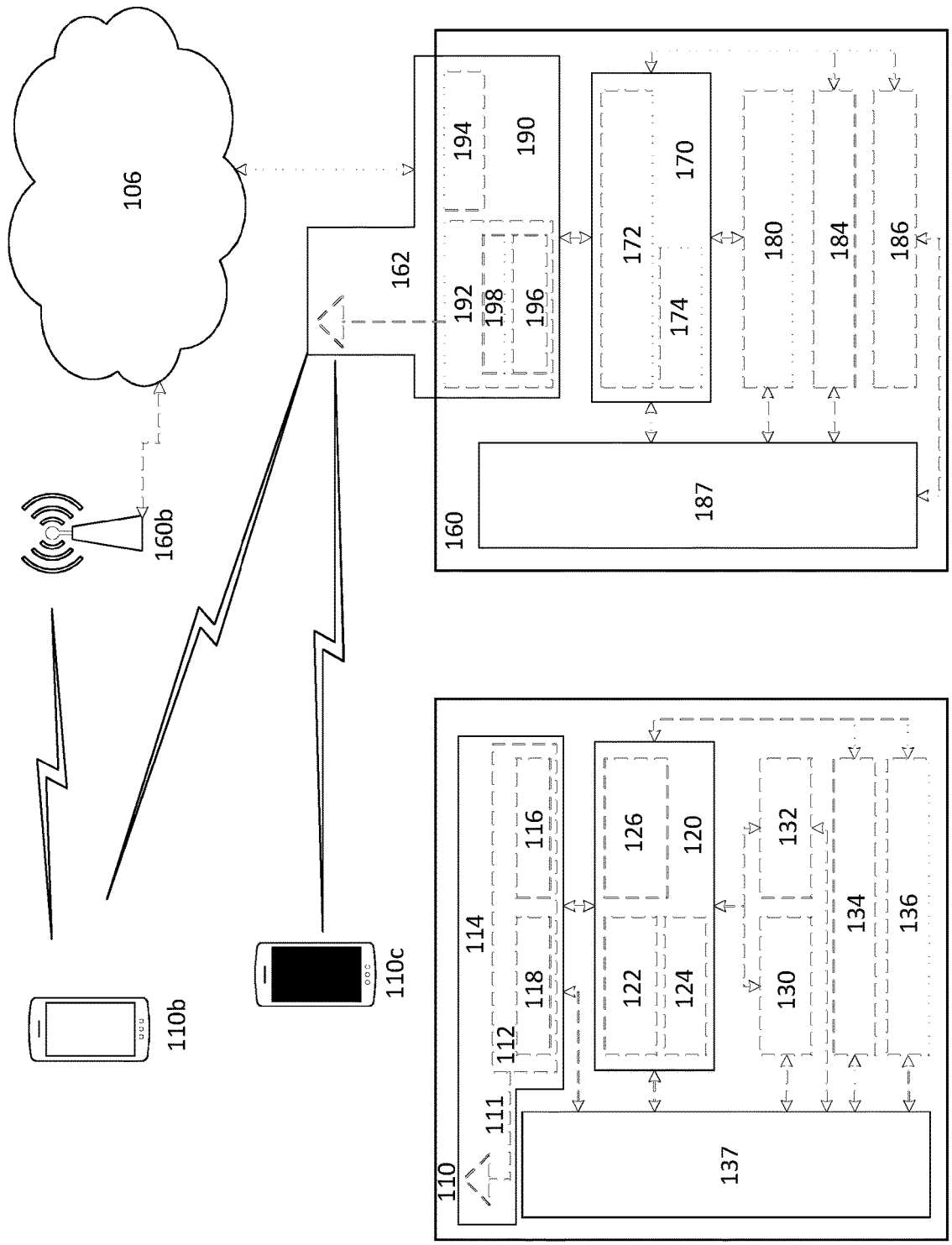
FIG. 4 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 5:
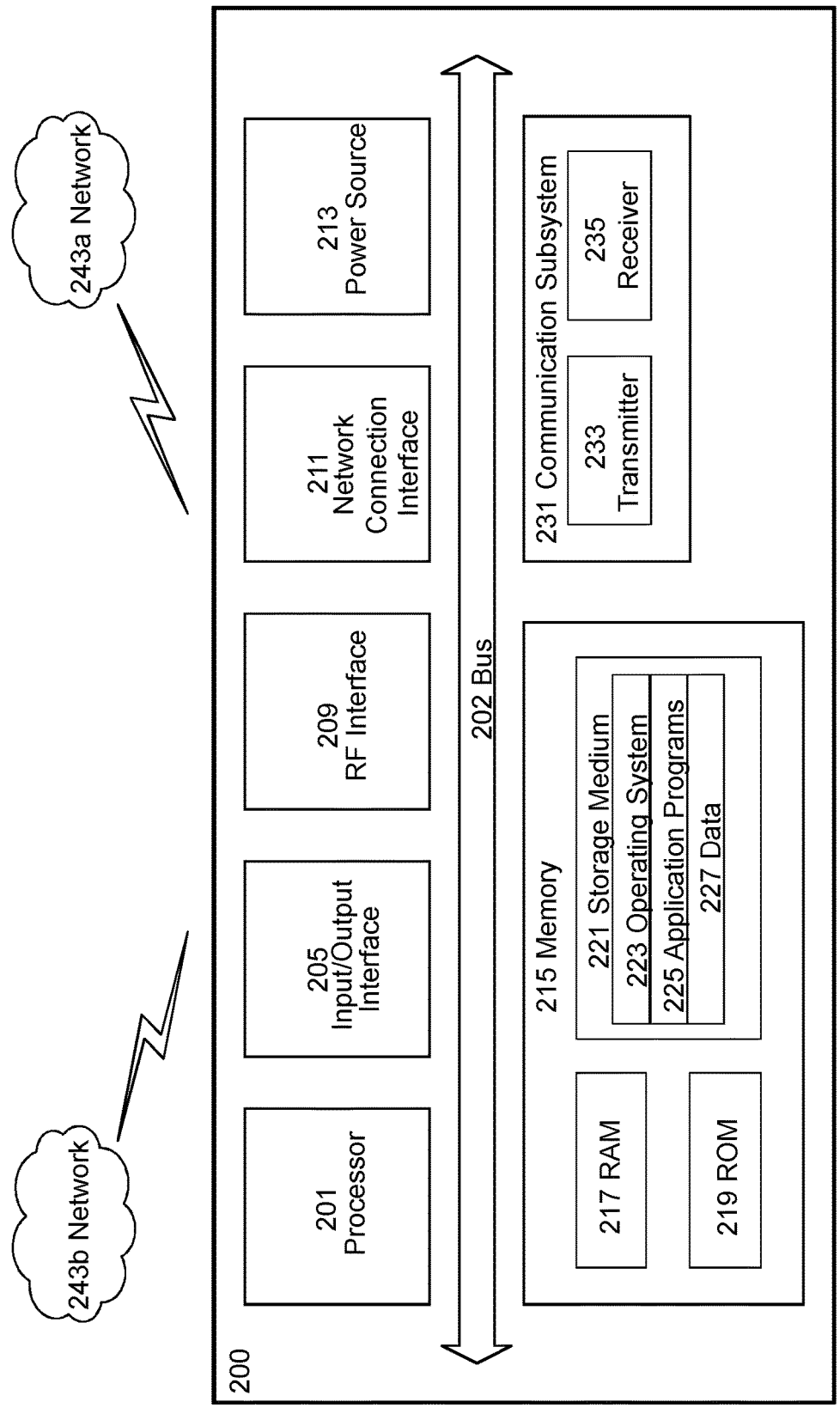
FIG. 5 illustrates an example user equipment, in accordance with certain embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 220 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
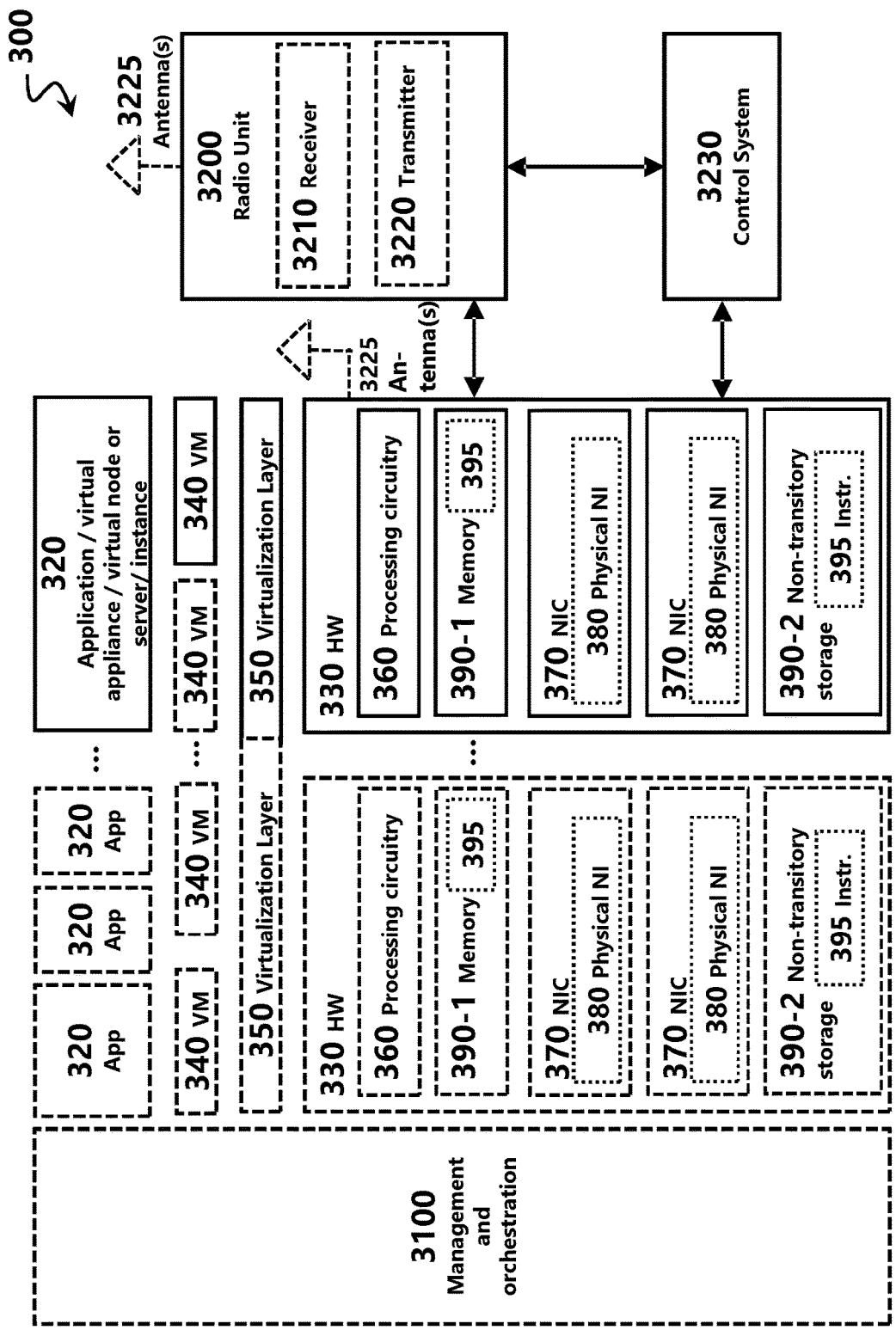
FIG. 6 illustrates an example virtualization environment, in accordance with certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 6.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 7:
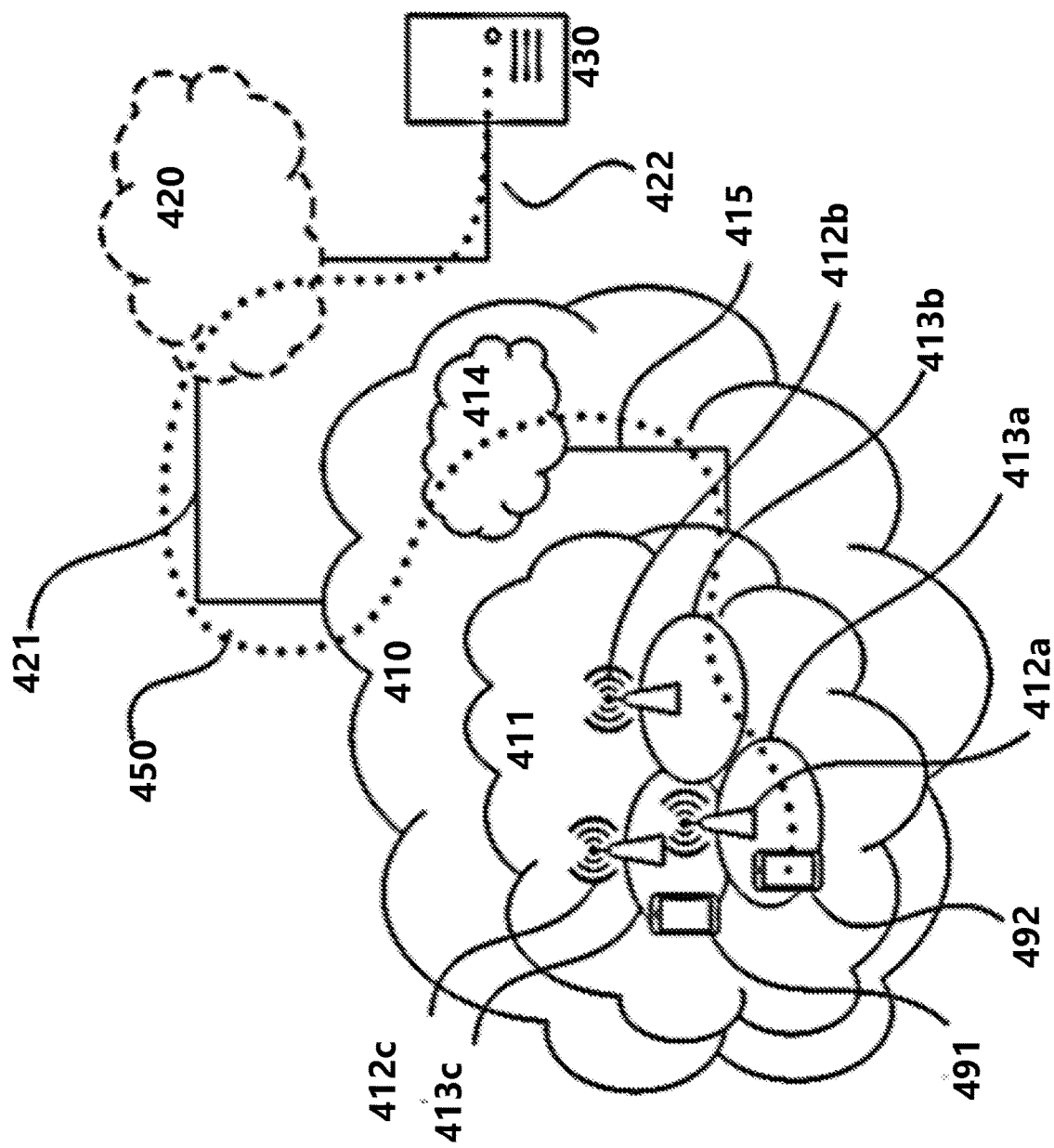
FIG. 7 illustrate an example telecommunication network connected via an intermediate network to a host computer, in accordance with certain embodiments.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 8. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 8:
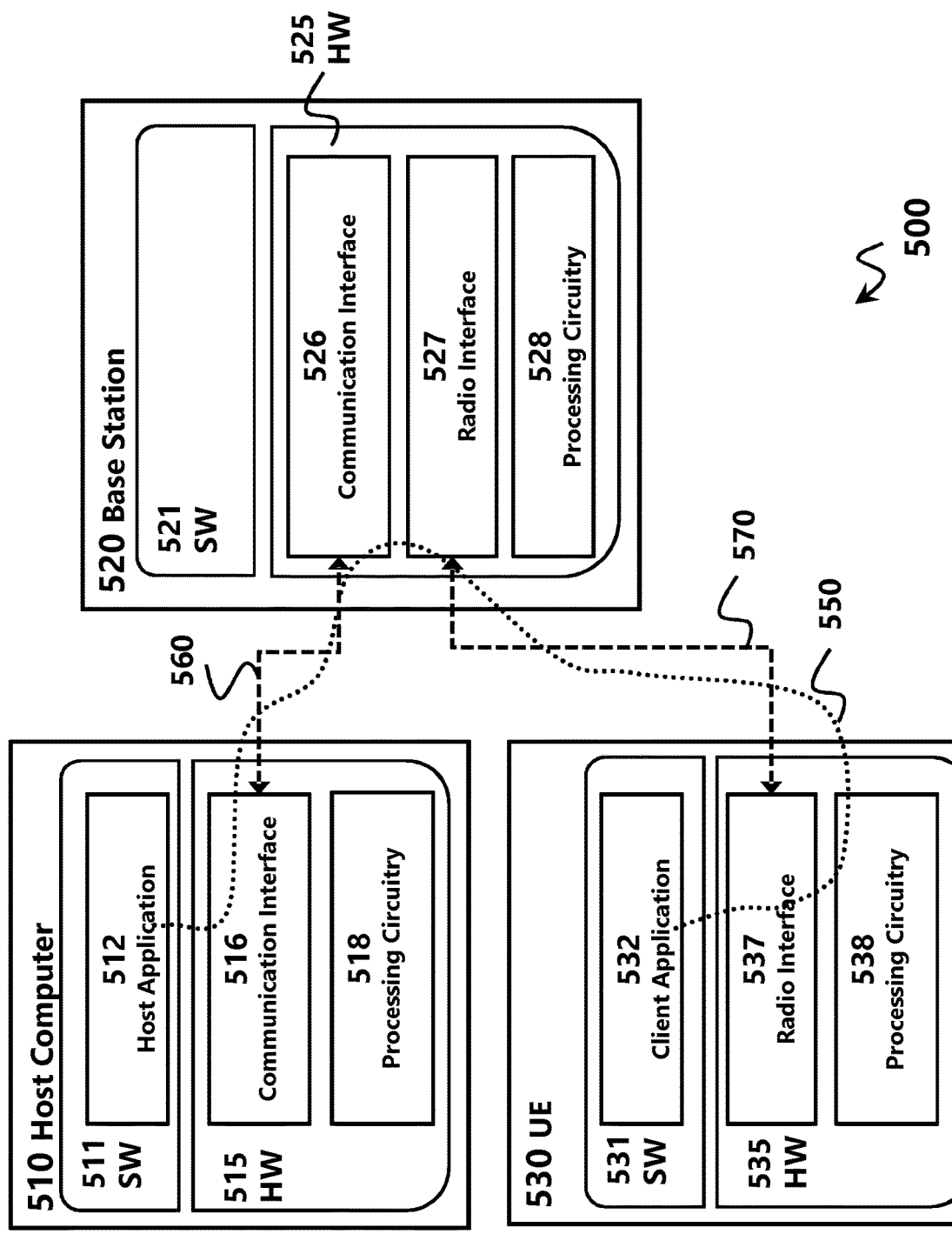
FIG. 8 illustrates an example host computer communicating via a base station with a user equipment over a partially wireless connection, in accordance with certain embodiments.

It is noted that host computer 510, base station 520 and UE 530 illustrated in FIG. 8 may be similar or identical to host computer 430, one of base stations 412*a*, 412*b*, 412*c* and one of UEs 491, 492 of FIG. 7, respectively. This is to say, the inner workings of these entities may be as shown in FIG. 8 and independently, the surrounding network topology may be that of FIG. 7.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 9:
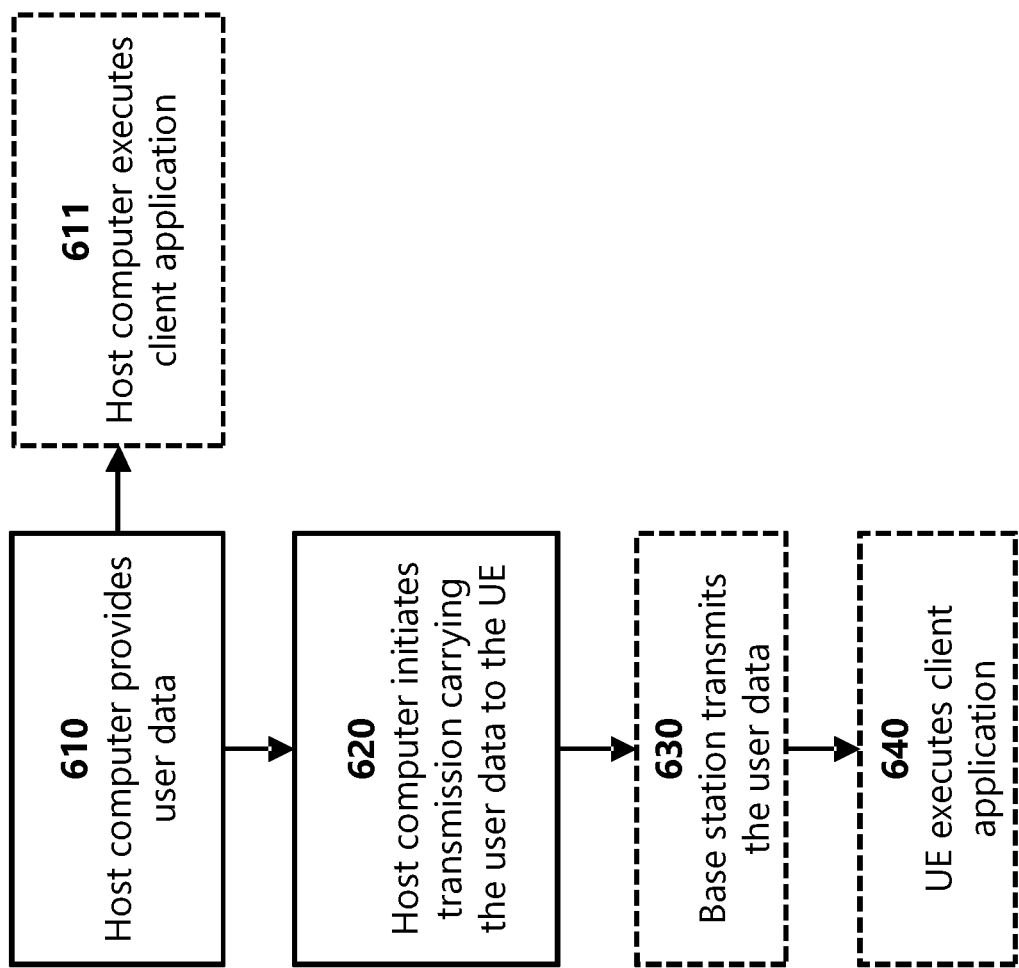
FIG. 9 is a flowchart illustrating an example method implemented in a communication system, in accordance certain embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 10:
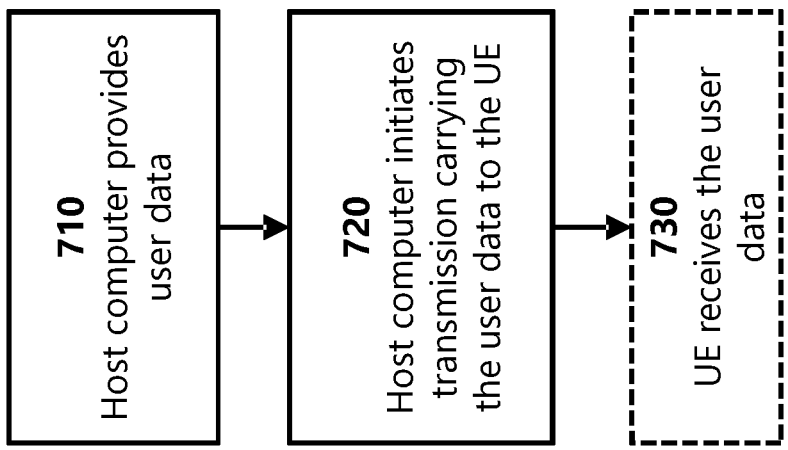
FIG. 10 is a flowchart illustrating an example method implemented in a communication system, in accordance with certain embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 13:
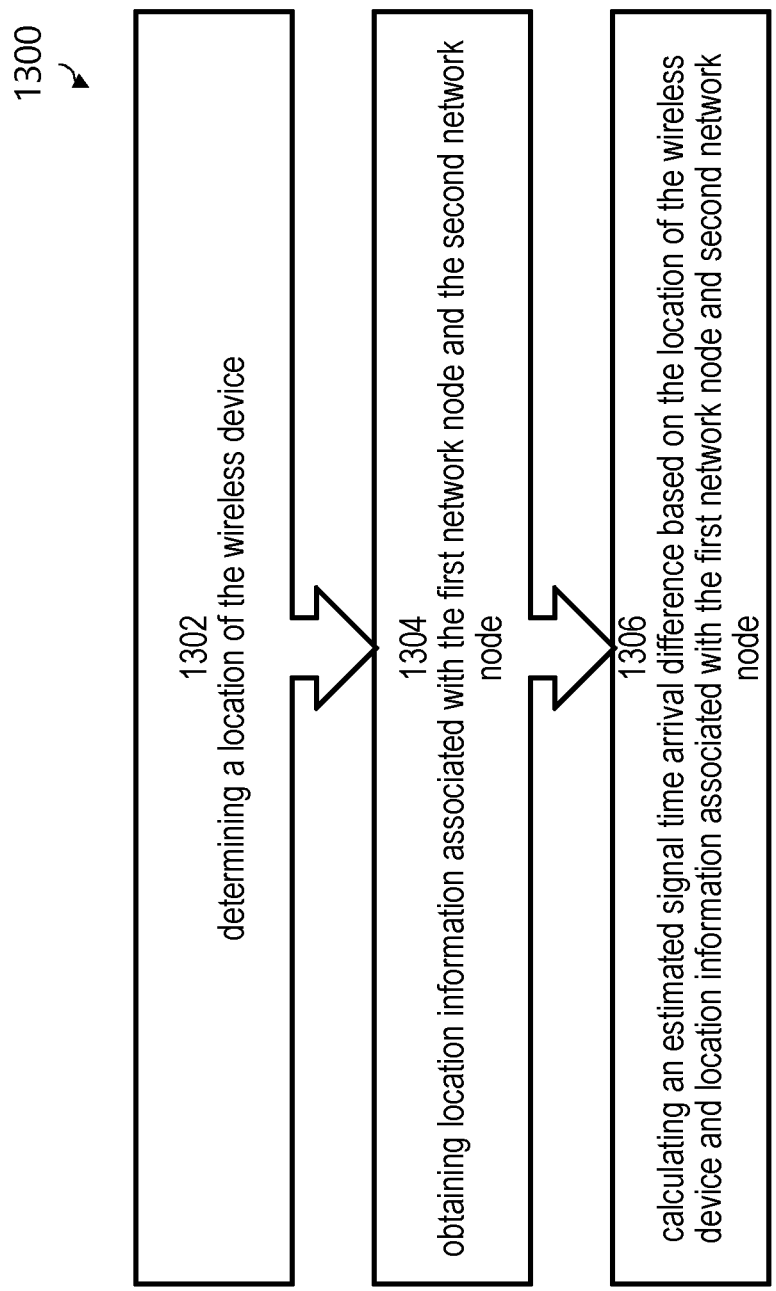
FIG. 13 illustrates an example method performed by a wireless device, in accordance with certain embodiments.

FIG. 13 depicts a method in accordance with particular embodiments, the method begins at step 1302 with determining a location of the wireless device. For example, a wireless device may determine its own location using a global navigation satellite system or a terrestrial system. At step 1304, location information associated with the first network node and the second network node may be obtained. For example, wireless device may communicate in a non-terrestrial network, which may include one or more satellites as network nodes. The wireless device may obtain location information regarding the satellites, such as their current locations and their trajectories. In this manner, the wireless device may be able to determine the locations of the network nodes at different points in time.

At step 1306, an estimated signal time arrival difference (ESTAD) may be calculated. For example, the wireless device may calculate the ESTAD based on the location of the wireless device and the location information associated with the network nodes. For example, the wireless device may determine propagation times associated with communications between the wireless device and the respective network nodes based on their relative positions. The wireless device may also obtain information about other propagation times within the NTN. For example, the wireless device may obtain propagation delay information for the signalling between gateways and the network nodes. Using the propagation delay information, the wireless device may calculate the ESTAD. In some embodiments, the wireless device may account for some uncertainty of its location and/or the location of the network nodes.

In certain embodiments, the method shown in 13 may include additional steps. For example, in certain embodiments, the method further includes the step of provisioning a SS/PBCH block measurement timing configuration (SMTC) based on the calculated ESTAD. In some embodiments, the method further includes the step of using the SMTC to detect one of the first network node and the second network node. For example, the wireless device may use the SMTC to detect a neighbour network node satellite as part of a handover procedure from a serving network node satellite.

Figure 14:
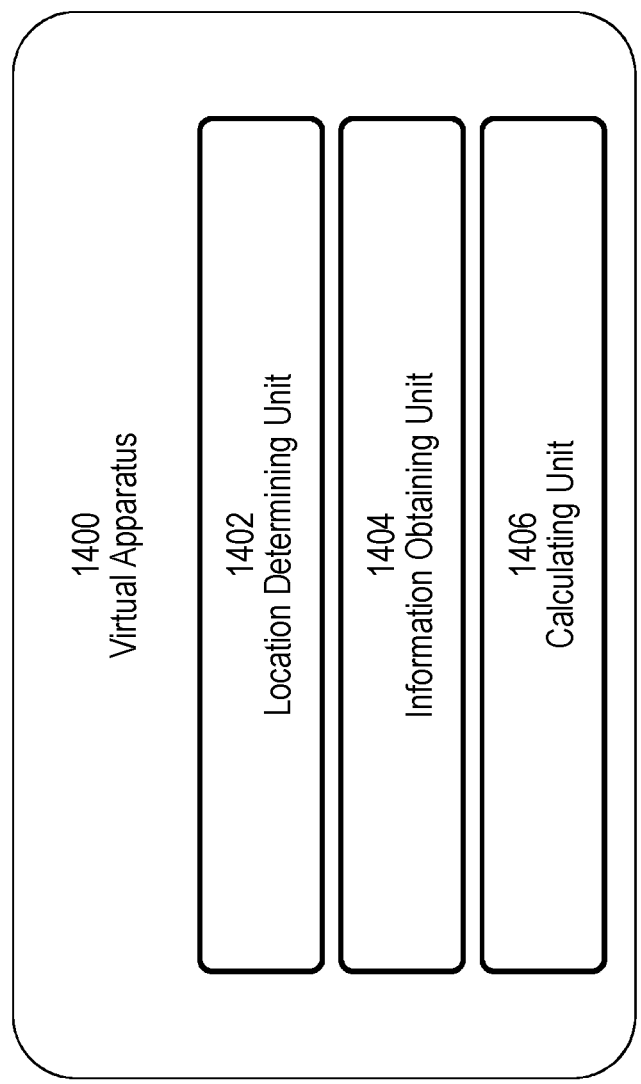
FIG. 14 illustrates a schematic block diagram of an example apparatus in a wireless network, in accordance with certain embodiments.

FIG. 14 illustrates a schematic block diagram of an apparatus 1400 in a wireless network (for example, the wireless network shown in FIG. 4). The apparatus may be implemented in a wireless device or network node (e.g., wireless device 110 or network node 160 shown in FIG. 4). Apparatus 1400 is operable to carry out the example method described with reference to FIG. 13 and possibly any other processes or methods disclosed herein. It is also to be understood that the method of FIG. 13 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Location Determining Unit 1402, Information Obtaining Unit 1404, Calculating Unit 1406, and any other suitable units of apparatus 1400 to perform corresponding functions according one or more embodiments of the present disclosure.

As illustrated in FIG. 14, apparatus 1400 includes Location Determining Unit 1402, Information Obtaining Unit 1404, and Calculating Unit 1406. Location Determining Unit 1402 is configured to determine a location of the wireless device. For example, a wireless device may determine its own location using a global navigation satellite system or a terrestrial system. Information Obtaining Unit 1404 is configured to obtain location information associated with the first network node and the second network node may be obtained. For example, wireless device may communicate in a non-terrestrial network, which may include one or more satellites as network nodes. The wireless device may obtain location information regarding the satellites, such as their current locations and their trajectories. In this manner, the wireless device may be able to determine the locations of the network nodes at different points in time.

Calculating Unit 1406 is configured to calculate an estimated signal time arrival difference (ESTAD) may be calculated. For example, the wireless device may calculate the ESTAD based on the location of the wireless device and the location information associated with the network nodes. For example, the wireless device may determine propagation times associated with communications between the wireless device and the respective network nodes based on their relative positions. The wireless device may also obtain information about other propagation times within the NTN. For example, the wireless device may obtain propagation delay information for the signalling between gateways and the network nodes. Using the propagation delay information, the wireless device may calculate the ESTAD. In some embodiments, the wireless device may account for some uncertainty of its location and/or the location of the network nodes.

In certain embodiments, apparatus 1400 may include one or more additional units or on or more units of apparatus 1400 may be configured to carry out additional functions.

For example, in certain embodiments, apparatus W100 may be configured to provision a SS/PBCH block measurement timing configuration (SMTC) based on the calculated ESTAD. In some embodiments, apparatus 1400 is further configured to use the SMTC to detect one of the first network node and the second network node. For example, the wireless device may use the SMTC to detect a neighbour network node satellite as part of a handover procedure from a serving network node satellite.

Figure 15:
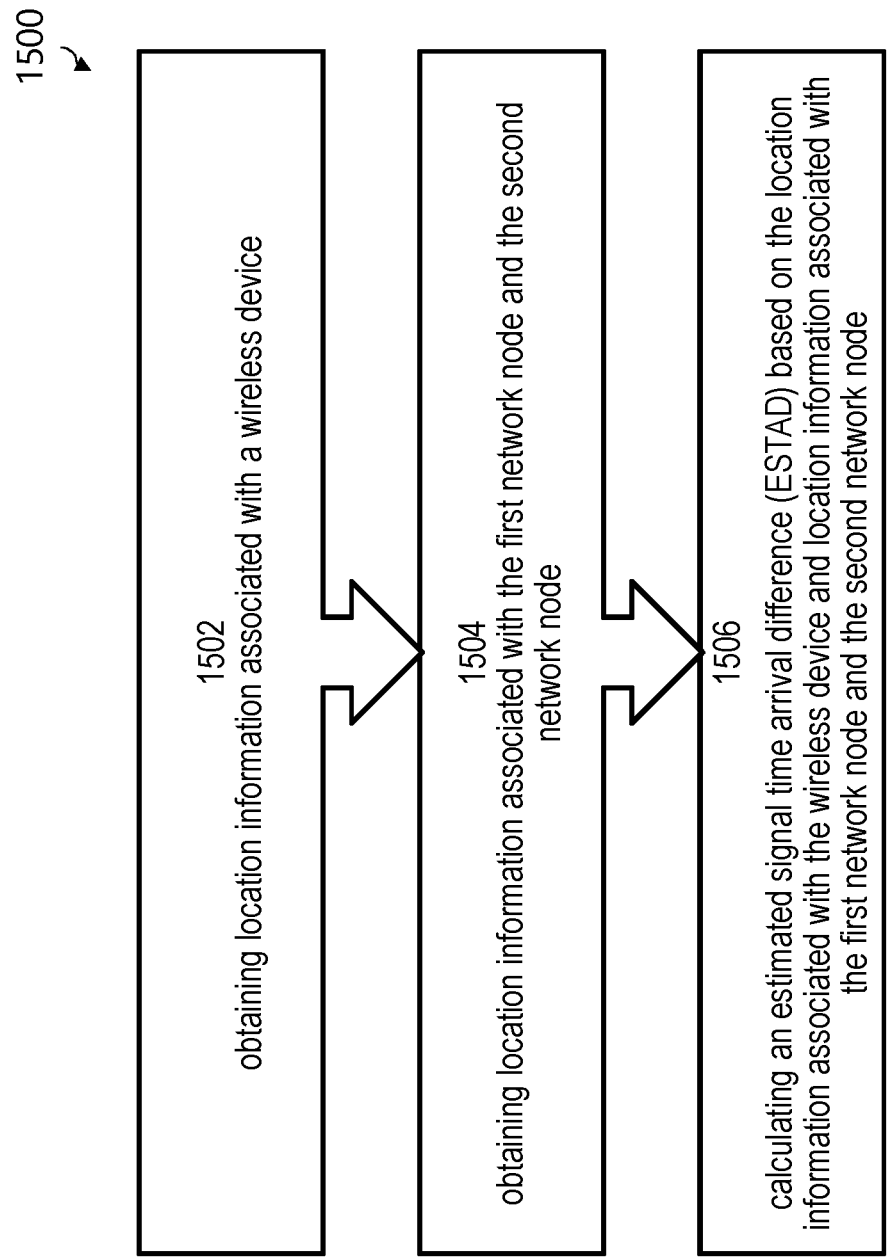
FIG. 15 illustrates an example method performed by a network node, in accordance with certain embodiments.

FIG. 15 depicts a method in accordance with particular embodiments, the method begins at step 1502 with obtaining location information associated with a wireless device. For example, a network node may determine the location of the wireless device own location using a global navigation satellite system or a terrestrial system. In some embodiments, the obtained location information has an associated uncertainty. This uncertainty may be determined when obtaining the location information and used in subsequent steps of the method. At step 1504, location information associated with the first network node and the second network node may be obtained. For example, wireless device may communicate in a non-terrestrial network, which may include one or more satellites as network nodes. The network node may obtain location information regarding the satellites, such as their current locations and their trajectories. In this manner, the network node may be able to determine the locations of the network nodes at different points in time.

At step 1506, an estimated signal time arrival difference (ESTAD) may be calculated. For example, the network node may calculate the ESTAD based on the location information associated with the wireless device and the location information associated with the network nodes. For example, the network node may determine propagation times associated with communications between the wireless device and the respective network nodes based on their relative positions. The network node may also obtain information about other propagation times within the NTN. For example, the network node may obtain propagation delay information for the signalling between gateways and the network nodes. Using the propagation delay information, the network node may calculate the ESTAD. In some embodiments, the network may account for some uncertainty of the location of the wireless device. For example, the network node may estimate the location of the wireless device using the center of the cell coverage of the network node serving the wireless device.

In certain embodiments, the method shown in FIG. 15 may include additional steps. For example, in certain embodiments, the method further includes the step communicating the ESTAD to the wireless device. The wireless device may provision a SMTC based on the calculated ESTAD and use the SMTC to detect one of the first network node and the second network node. For example, the wireless device may use the SMTC to detect a neighbour network node satellite as part of a handover procedure from a serving network node satellite. In certain embodiments, the calculated ESTAD may be used to configure a self-organizing network.

Figure 16:
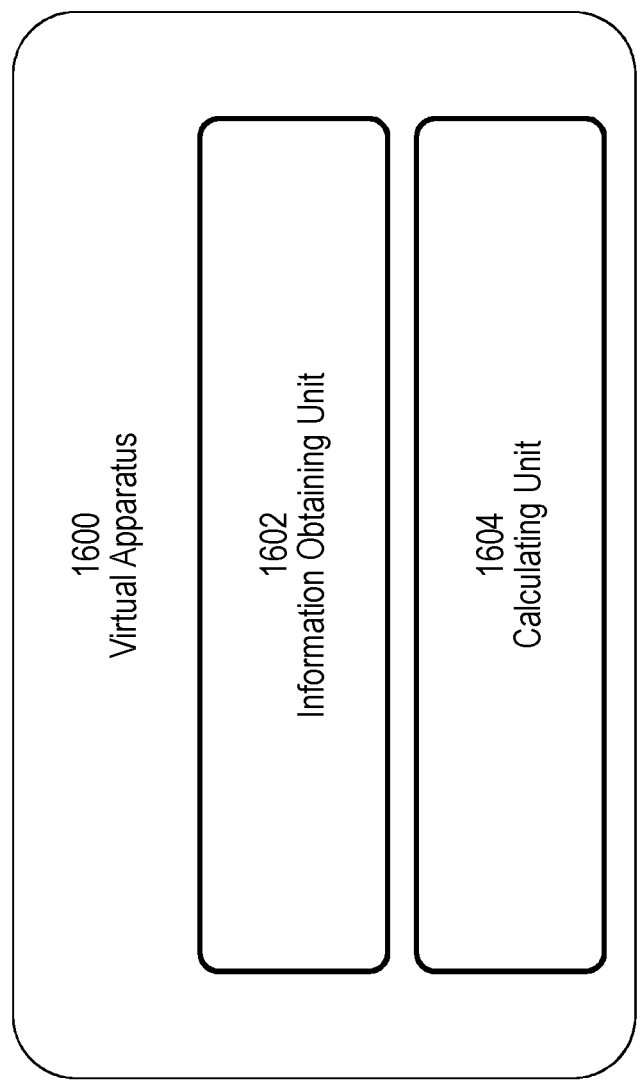
FIG. 16 illustrates a schematic block diagram of an example apparatus in a wireless network, in accordance with certain embodiments.

FIG. 16 illustrates a schematic block diagram of an apparatus 1600 in a wireless network (for example, the wireless network shown in FIG. 4). The apparatus may be implemented in a wireless device or network node (e.g., wireless device 110 or network node 160 shown in FIG. 4). Apparatus 1600 is operable to carry out the example method described with reference to FIG. 15 and possibly any other processes or methods disclosed herein. It is also to be understood that the method of FIG. 15 is not necessarily carried out solely by apparatus 1600. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Information Obtaining Unit 1602, Calculating Unit 1604, and any other suitable units of apparatus 1600 to perform corresponding functions according one or more embodiments of the present disclosure.

As illustrated in FIG. 16, apparatus 1600 includes Information Obtaining Unit 1602 and Calculating Unit 1604. Information Obtaining Unit 1602 is configured to obtain location information of a wireless device. For example, a network node may determine the location of a wireless device own location using a global navigation satellite system or a terrestrial system. Information Obtaining Unit 1602 is further configured to obtain location information associated with the first network node and the second network node may be obtained. For example, the network node may communicate in a non-terrestrial network, which may include one or more satellites as network nodes. The network node may obtain location information regarding the satellites, such as their current locations and their trajectories. In this manner, the network node may be able to determine the locations of the network nodes at different points in time.

Calculating Unit 1604 is configured to calculate an estimated signal time arrival difference (ESTAD) may be calculated. For example, the network node may calculate the ESTAD based on the location of the wireless device and the location information associated with the network nodes. For example, the network node may determine propagation times associated with communications between the wireless device and the respective network nodes based on their relative positions. The network node may also obtain information about other propagation times within the NTN. For example, the network node may obtain propagation delay information for the signalling between gateways and the network nodes. Using the propagation delay information, the network node may calculate the ESTAD. In some embodiments, the network node may account for some uncertainty of the location of the wireless device and/or the location of the network nodes.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Sample Embodiments

Group A Embodiments

1. A method performed by a wireless device for communication in a non-terrestrial network (NTN) comprising at least a first network node and a second network node, the method comprising:
   determining a location of the wireless device
   obtaining location information associated with the first network node and second network node
   calculating an estimated signal time arrival difference based on the location of the wireless device and location information associated with the first network node and second network node.
2. The method of embodiment 1, further comprising using the estimated signal time arrival difference to detect one of the first network node and the second network node.
3. The method of embodiments 1-2, further comprising using the estimated signal time arrival difference to provision a SS/PBCH block measurement timing configuration (SMTC).
4. The method of embodiment 3, further comprising using the SMTC to detect one of the first network node and the second network node.
5. The method of embodiments 1-4, further comprising:
   determining a propagation time between the first network node and the wireless device using the location of the wireless device and the location information associated with the first network node; and
   determining a propagation time between the second network node and the wireless device using the location of the wireless device and the location information associated with the second network node;
   wherein the propagation times are used in calculating the estimated signal time arrival difference.
6. The method of embodiments 1-5, further comprising:
   obtaining the propagation time between the first network node and a first gateway; and
   obtaining the propagation time between the second network node and a second gateway;
   wherein the propagation times are used in calculating the estimated signal time arrival difference.
7. The method of embodiment 6, wherein:
   obtaining the propagation time between the first network node and the first gateway comprises calculating the propagation time using received location information of the first gateway;
   obtaining the propagation time between the second network node and the second gateway comprises calculating the propagation time using received location information of the second gateway; and
   the NTN is operated in a bent-pipe mode.
8. The method of embodiments 1-7, further comprising receiving one or more satellite reference signals using the estimated signal time arrival different.
9. The method of embodiments 1-8, further comprising participating in a handover procedure from the first network node to the second network node using the estimated signal time arrival difference
10. The method of embodiments 1-9, wherein the first network node and the second network node are satellites.
11. The method of embodiment 10, wherein the first network node and the second network node are each on of a low-earth orbiting satellite, a medium-earth orbiting satellite, and a geostationary satellite.
12. The method of embodiments 1-11, wherein obtaining location information associated with the first network node and second network node comprises obtaining trajectory information associated with the first network node and the second network node, wherein the trajectory information comprises information regarding the movement of the first network node and the second network node.
13. The method of embodiments 1-12, wherein:
   the first network node and the second network node are operated in a regenerative mode; and
   the estimated signal time arrival difference is further based on the synchronization between the first network node and the second network node.
14. The method of embodiments 1-13, wherein determining a location of the wireless device comprises determining the location of the wireless device using a global navigation satellite system.
15. The method of embodiments 1-14, further comprising the step of determining an uncertainty associated with the location of the wireless device.
16. The method of embodiments 1-15, further comprising the step of providing information to the NTN that the wireless device is capable of calculating the estimated signal time arrival difference.
17. The method of embodiments 1-16, further comprising the step of abstaining from listening for other cells until the estimated signal time arrival difference is calculated.
18. The method of any of the previous embodiments, further comprising:
   providing user data; and
   forwarding the user data to a host computer via the transmission to the base station.

Group B Embodiments

19. A method performed by a base station for communication in a non-terrestrial network (NTN) comprising at least a first network node and a second network node, the method comprising:
   obtaining location information associated with a wireless device;
   obtaining location information associated with the first network node and the second network node; and
   calculating an estimated signal time arrival difference based on the location information associated with the wireless device and location information associated with the first network node and second network node.
20. The method of embodiment 19, further comprising signaling the estimated signal time arrival difference to the wireless device, wherein the wireless device uses the estimated signal time arrival difference to detect one of the first network node and the second network node.
21. The method of embodiments 19-20, wherein the wireless device uses the estimated signal time arrival difference to provision a SS/PBCH block measurement timing configuration (SMTC).
22. The method of embodiment 21, wherein the wireless device uses the SMTC to detect one of the first network node and the second network node.
23. The method of embodiments 19-22, further comprising the steps of:

determining a propagation time between the first network node and the wireless device using the location of the wireless device and the location information associated with the first network node determining a propagation time between the second network node and the wireless device using the location of the wireless device and the location information associated with the second network node wherein the propagation times are used in calculating the estimated signal time arrival difference.

24. The method of embodiments 19-23, further comprising the steps of:

obtaining a propagation time between the first network node and a first gateway obtaining a propagation time between the second network node and a second gateway wherein the propagation times are used in calculating the estimated signal time arrival difference.

25. The method of embodiment 24, wherein:

obtaining the propagation time between the first network node and the first gateway comprises calculating the propagation time using received location information of the first gateway obtaining the propagation time between the second network node and the second gateway comprises calculating the propagation time using received location information of the second gateway the NTN is operated in a bent-pipe mode.

26. The method of embodiments 19-25, wherein the wireless device receives one or more satellite reference signals using the estimated signal time arrival different.

27. The method of embodiments 19-26, wherein the first network node and the second network node are satellites.

28. The method of embodiment 27, wherein the first network node and the second network node are each on of a low-earth orbiting satellite, a medium-earth orbiting satellite, and a geostationary satellite.

29. The method of embodiments 19-28, wherein obtaining location information associated with the first network node and second network node comprises obtaining trajectory information associated with the first network node and the second network node, wherein the trajectory information comprises information regarding the movement of the first network node and the second network node.

30. The method of embodiments 19-29, wherein:

the first network node and the second network node are operated in a regenerative mode; and the estimated signal time arrival difference is further based on the synchronization between the first network node and the second network node.

31. The method of embodiments 19-30, wherein obtaining location information associated with the wireless device comprises determining the location of the wireless device using a global navigation satellite system or using a terrestrial cellular method.

32. The method of embodiments 19-31, wherein the location information associated with the wireless device does not allow the base station to accurately estimate the location of the wireless device.

33. The method of embodiment 32, wherein:

determining a propagation time between the first network node and the wireless device comprises estimating a time value of delay from a center of cell coverage of the first network node to the first network node; and determining a propagation time between the second network node and the wireless device comprises estimating a time value of delay from a center of cell coverage of the second network node to the second network node 34. The method of embodiments 19-33, further comprising determining an uncertainty associated with the location of the wireless device.

35. The method of embodiment 34, further comprising signaling the uncertainty associated with the location of the wireless device to the wireless device.

36. The method of embodiments 19-35, further comprising providing information to the NTN that the wireless device is capable of calculating the estimated signal time arrival difference.

37. The method of any of the previous embodiments, further comprising:

obtaining user data; and forwarding the user data to a host computer or a wireless device.

Group C Embodiments

38. A wireless device for communication in a non-terrestrial network (NTN), the wireless device comprising:

processing circuitry configured to perform any of the steps of any of the Group A embodiments; and power supply circuitry configured to supply power to the wireless device.

39. A base station for communication in a non-terrestrial network (NTN), the base station comprising:

processing circuitry configured to perform any of the steps of any of the Group B embodiments;

power supply circuitry configured to supply power to the base station.

40. A user equipment (UE) for communication in a non-terrestrial network (NTN), the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

41. A computer program, the computer program comprising instructions which when executed on a computer perform any of the steps of any of the Group A embodiments.

42. A computer program product comprising a computer program, the computer program comprising instructions which when executed on a computer perform any of the steps of any of the Group A embodiments.

43. A non-transitory computer-readable storage medium or carrier comprising a computer program, the computer program comprising instructions which when executed on a computer perform any of the steps of any of the Group A embodiments.

44. A computer program, the computer program comprising instructions which when executed on a computer perform any of the steps of any of the Group B embodiments.

45. A computer program product comprising a computer program, the computer program comprising instructions which when executed on a computer perform any of the steps of any of the Group B embodiments.

46. A non-transitory computer-readable storage medium or carrier comprising a computer program, the computer program comprising instructions which when executed on a computer perform any of the steps of any of the Group B embodiments.

47. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

48. The communication system of the pervious embodiment further including the base station.

49. The communication system of the previous 2 embodiments, further including the UE, wherein the UE is configured to communicate with the base station.

50. The communication system of the previous 3 embodiments, wherein:
   the processing circuitry of the host computer is configured to execute a host application, thereby providing the user data; and
   the UE comprises processing circuitry configured to execute a client application associated with the host application.

51. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.

52. The method of the previous embodiment, further comprising, at the base station, transmitting the user data.

53. The method of the previous 2 embodiments, wherein the user data is provided at the host computer by executing a host application, the method further comprising, at the UE, executing a client application associated with the host application.

54. A user equipment (UE) configured to communicate with a base station, the UE comprising a radio interface and processing circuitry configured to performs the of the previous 3 embodiments.

55. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.

56. The communication system of the previous embodiment, wherein the cellular network further includes a base station configured to communicate with the UE.

57. The communication system of the previous 2 embodiments, wherein:
   the processing circuitry of the host computer is configured to execute a host application, thereby providing the user data; and
   the UE's processing circuitry is configured to execute a client application associated with the host application.

58. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

59. The method of the previous embodiment, further comprising at the UE, receiving the user data from the base station.

60. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.

61. The communication system of the previous embodiment, further including the UE.

62. The communication system of the previous 2 embodiments, further including the base station, wherein the base station comprises a radio interface configured to communicate with the UE and a communication interface configured to forward to the host computer the user data carried by a transmission from the UE to the base station.

63. The communication system of the previous 3 embodiments, wherein:
   the processing circuitry of the host computer is configured to execute a host application; and
   the UE's processing circuitry is configured to execute a client application associated with the host application, thereby providing the user data.

64. The communication system of the previous 4 embodiments, wherein:
   the processing circuitry of the host computer is configured to execute a host application, thereby providing request data; and the UE's processing circuitry is configured to execute a client application associated with the host application, thereby providing the user data in response to the request data.
65. A method implemented in a communication system including a host computer, a base station and a user equipment (UE), the method comprising:
    at the host computer, receiving user data transmitted to the base station from the UE, wherein the UE performs any of the steps of any of the Group A embodiments.
66. The method of the previous embodiment, further comprising, at the UE, providing the user data to the base station.
67. The method of the previous 2 embodiments, further comprising:
    at the UE, executing a client application, thereby providing the user data to be transmitted; and
    at the host computer, executing a host application associated with the client application.
68. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.
69. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
70. The communication system of the previous embodiment further including the base station.
71. The communication system of the previous 2 embodiments, further including the UE, wherein the UE is configured to communicate with the base station.
72. The communication system of the previous 3 embodiments, wherein:
    the processing circuitry of the host computer is configured to execute a host application;
    the UE is configured to execute a client application associated with the host application, thereby providing the user data to be received by the host computer.
73. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.
74. The method of the previous embodiment, further comprising at the base station, receiving the user data from the UE.
75. The method of the previous 2 embodiments, further comprising at the base station, initiating a transmission of the received user data to the host computer.

Figure 17:
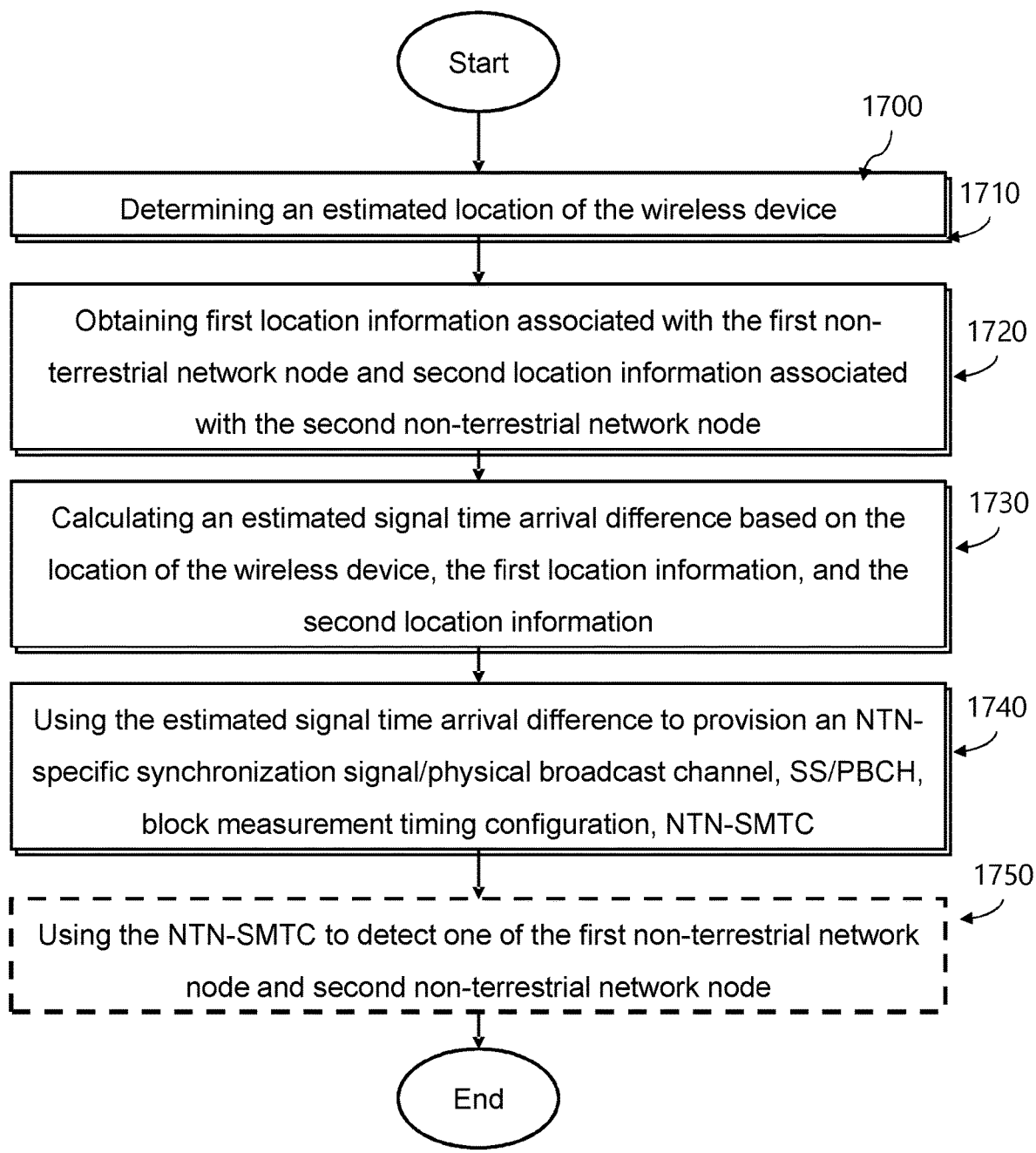
FIG. 17 illustrates an example method performed by a wireless device, in accordance with certain embodiments.

FIG. 17 illustrates an example flowchart for a third example method 1700 for use in a wireless device, such as wireless device 110b or 110c or wireless device 200 described above in reference to FIGS. 4 and 5. In certain embodiments, the wireless device is in a non-terrestrial network, NTN, comprising at least a first non-terrestrial network node and a second non-terrestrial network node. Method 1700 may begin at step 1710 in which the estimated location of the wireless device is determined. For example, the wireless device may use a global-positioning system to determine its location or may use any other suitable method to obtain an estimation of its location. Prior to beginning method 1700 or as a first step before step 1710, the wireless device may indicate to the non-terrestrial network that the wireless device is capable of calculating the ESTAD. In this manner, the non-terrestrial network may abstain from calculating the ESTAD and allow the wireless device to carry out the calculation itself.

At step 1720, the wireless device may obtain first location information associated with the first non-terrestrial network node and second location information associated with the second non-terrestrial network node. For example, the wireless device may obtain the location and/or trajectory of the non-terrestrial network nodes (e.g., a serving node and a target node). The location information associated with the non-terrestrial network nodes may include information not only of the location and/or trajectory of the non-terrestrial network nodes but also location information about gateways through which the non-terrestrial network nodes communicate with the wireless device and a core network of the wireless network.

At step 1730, an ESTAD is calculated based on the location of the wireless device, the first location information, and the second location information. For example, in certain embodiments, the wireless device may determine propagation times between the non-terrestrial nodes and the wireless device using the location of the wireless device and the obtained location information. As another example, the wireless device may obtain propagation times between the non-terrestrial network nodes and one or more gateways through which the non-terrestrial network nodes communicate with the core network. The wireless device may then use one, some, or all of the propagation times to calculate the ESTAD.

In certain embodiments, the location information and how the ESTAD is calculated is based on the type of non-terrestrial network in which the wireless device is communicating. In some embodiments, at least one of the first non-terrestrial network node and the second non-terrestrial network node is operated in a bent-pipe mode. In this manner, the wireless device may calculate the ESTAD without having to obtain or use synchronization information that may adjust the timing, which may be used if operated in a regenerative mode. Further, in some embodiments, at least one of the first non-terrestrial network node and the second non-terrestrial network node is a low-earth orbiting satellite, a medium-earth orbiting satellite, or a geostationary satellite.

At step 1740, the ESTAD is used to provision an NTN-SMTC. For example, the wireless node may signal the ESTAD to the network. In response, a NTN-SMTC may be provided. The NTN-SMTC may be NTN-specific. This may include a SMTC that has a different offset and/or frequency compared to the convention SMTC1 and SMTC2. In this manner, the offset, e.g., for detecting reference signals, etc., may be customized or optimized for non-terrestrial networks that typically have larger signaling delays.

In certain embodiments, method 1700 may include one or more additional or optional steps or substeps. In some embodiments, method 1700 be augmented or supplemented with one or more steps from the description of the functionality of wireless devices and user equipments described herein. For example, in certain embodiments, method 1700 includes the optional step 1750 in which the wireless device uses the NTN-SMTC to detect one of the first non-terrestrial network node and second non-terrestrial network node. For example, in some embodiments, the wireless device further participates in a handover procedure from the first non-terrestrial network node to the second non-terrestrial network node using the NTN-SMTC. In particular, in some embodiments, the NTN-SMTC may be used to receive one or more satellite reference signals using the NTN-SMTC, e.g., from the target non-terrestrial node. In this manner, the NTN-SMTC may be provided to ensure that signals from the non-terrestrial nodes may be received, even if characterized with larger delays compared to terrestrial network nodes. Further, method 1700 may be modified in any suitable manner to incorporate any of the subject matter described herein and/or to apply to network configurations to which the techniques described herein may apply.

Figure 18:
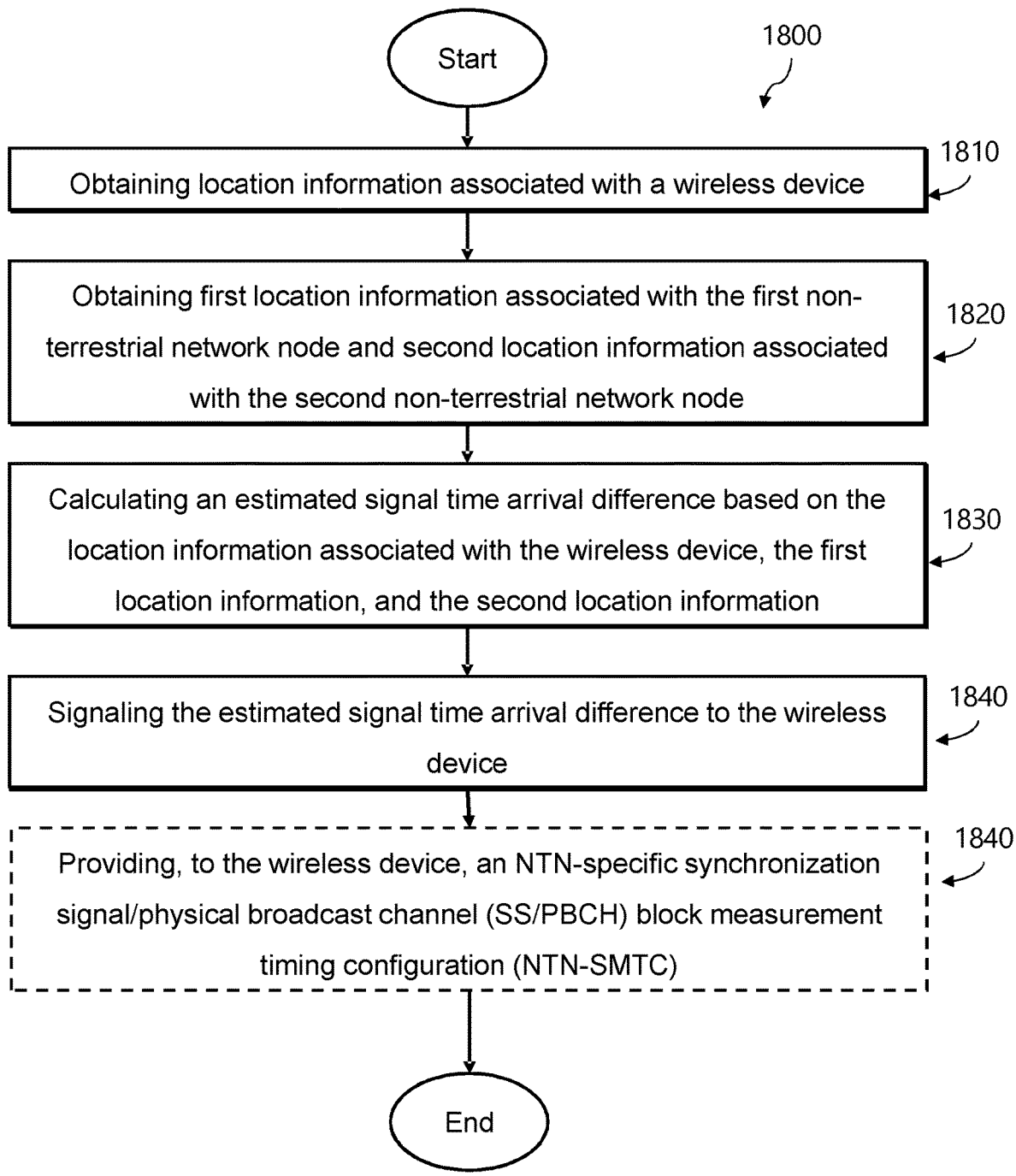
FIG. 18 illustrates an example method performed by a network node, in accordance with certain embodiments.

FIG. 18 illustrates an example flowchart for an example method 1800 for use in a network node, such as network node 160 as described above in reference to FIG. 4. In certain embodiments, the network node is a first non-terrestrial network node in a non-terrestrial network, NTN, comprising at least a first non-terrestrial network node and a second non-terrestrial network node. The non-terrestrial nodes, in some embodiments, are satellites in an earth orbit (low, high, geosynchronous, etc.). Method 1800 may begin at 1810, in which location information associated with a wireless device is obtained. For example, the network node may obtain the location of the wireless device from the wireless device, e.g., after it uses a global positioning system or other method to determine its location, or via any suitable measurement process by the network node or other portion of the network.

At step 1820, the network node obtains first location information associated with the first non-terrestrial network node and second location information associated with the second non-terrestrial network node. As described above, this may include not only the location and/or trajectory of the non-terrestrial network nodes but also location information about gateways through which the non-terrestrial network nodes communicate with the wireless device and a core network of the wireless network.

At step 1830, an ESTAD is calculated based on the location information associated with the wireless device, the first location information, and the second location information. The calculation of the ESTAD may be carried out in any suitable manner, including using propagation times and/or synchronization information to determine the one or more times or distances of signaling within the non-terrestrial network. According to certain embodiments, the first non-terrestrial network node and the second non-terrestrial network node are operated in a regenerative mode. Accordingly, the estimated signal time arrival difference may be further based on the synchronization between the first non-terrestrial network node and the second non-terrestrial network node. In this manner, the network node may accurately determine the ESTAD.

At step 1840, the estimated signal time arrival difference is signalled to the wireless device. For example, the ESTAD may be signalled directly from the network node to the wireless device or may be signalled via one or more other network nodes or networks. As a result, the wireless device may obtain the ESTAD prior to an attempt to detect a second, non-terrestrial network node. For example, the wireless device may determine, based on the ESTAD, that the normal SMTC (as described above) would likely be insufficient to detect signals or broadcasts from the second, non-terrestrial network node. Accordingly, the wireless device may notify the network node of this condition and an accommodation, e.g., non-terrestrial SMTC or offset/window adjustment, may be provided.

In certain embodiments, method 1800 may include one or more additional or optional steps or substeps. For example, in certain embodiments, signalling the ESTAD to the wireless device in step 1840 comprises signalling the ESTAD to a wireless device that is configured to determine whether the ESTAD exceeds a predetermined threshold or matches one or more predetermined criteria. If the ESTAD exceeds the predetermined threshold or matches the one or more predetermined criteria, the wireless device may request an NTN-SMTC from the network node. From the perspective of the network node, the network node receives the request for the NTN-SMTC from the wireless device (e.g., the request for the NTN-SMTC is received after providing the wireless device with the ESTAD in step 1840). The method further includes providing the NTN-SMTC to the wireless device in step 1845. Before providing the NTN-SMTC to the wireless device, the network node may determine if an NTN-SMTC is appropriate based on the request or may determine one or more parameters of the NTN-SMTC and configure the NTN-SMTC with the one or more parameters.

Accordingly, the wireless device may be provided with the NTN-SMTC, which may be used to communicated more efficiently within the non-terrestrial network (e.g., based on its offset or frequency that can be customized or adapted for non-terrestrial networks). For example, in some embodiments, the NTN-SMTC is used to detect one of the first non-terrestrial network node and the second non-terrestrial network node. In particular, the NTN-SMTC may enable the wireless device to receive one or more satellite reference signals. As another example, the NTN-SMTC may be involved in a handover procedure with the network node. For example, the NTN-SMTC may be requested prior to a handover procedure from the network node to another non-terrestrial network node, and then used to detect the target network node and proceed with the handover.

In some embodiments, method 1800 be augmented or supplemented with one or more steps from the description of the functionality of network nodes, such as the non-terrestrial network nodes/satellites described herein. Further, method 1800 may be modified in any suitable manner to incorporate any of the subject matter described herein and/or to apply to network configurations to which the techniques described herein may apply.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

The invention claimed is:

1. A method performed by a wireless device for communication in a non-terrestrial network, NTN, comprising at least a first non-terrestrial network node and a second non-terrestrial network node, the method comprising:
    determining an estimated location of the wireless device;
    obtaining first location information associated with the first non-terrestrial network node and second location information associated with the second non-terrestrial network node;

calculating an estimated signal time arrival difference based on the location of the wireless device, the first location information, and the second location information;

using the estimated signal time arrival difference to provision an NTN-specific synchronization signal/physical broadcast channel, SS/PBCH, block measurement timing configuration, NTN-SMTC and using the NTN-SMTC to detect one of the first non-terrestrial network node and second non-terrestrial network node.

2. A method performed by a first non-terrestrial network node for communication in a non-terrestrial network, NTN, comprising at least the first non-terrestrial network node and a second non-terrestrial network node, the method comprising:

obtaining location information associated with a wireless device;

obtaining first location information associated with the first non-terrestrial network node and second location information associated with the second non-terrestrial network node;

calculating an estimated signal time arrival difference based on the location information associated with the wireless device, the first location information, and the second location information;

signaling the estimated signal time arrival difference to the wireless device; and providing, to the wireless device, an NTN-specific synchronization signal/physical broadcast channel, SS/PBCH, block measurement timing configuration, NTN-SMTC;

wherein the NTN-SMTC is provided in response to receiving a request from the wireless device after the signaling of the estimated signal time arrival difference to the wireless device; and wherein the NTN-SMTC is used to detect one of the first non-terrestrial network node and the second non-terrestrial network node.

3. A wireless device in a non-terrestrial network, NTN, comprising at least a first non-terrestrial network node and a second non-terrestrial network node, the wireless device comprising:

a memory configured to store instructions; and processing circuitry configured to execute the instructions, wherein the wireless device is configured to:

determine an estimated location of the wireless device;

obtain first location information associated with the first non-terrestrial network node and second location information associated with the second non-terrestrial network node;

calculate an estimated signal time arrival difference based on the location of the wireless device, the first location information, and the second location information;

use the estimated signal time arrival difference to provision an NTN-specific synchronization signal/physical broadcast channel, SS/PBCH, block measurement timing configuration, NTN-SMTC; and use the NTN-SMTC to detect one of the first non-terrestrial network node and second non-terrestrial network node.

4. The wireless device of claim 3, wherein to calculate the estimated signal time arrival difference, the wireless device is further configured to:

determine a first propagation time between the first non-terrestrial network node and the wireless device using the location of the wireless device and the first location information;

determine a second propagation time between the second non-terrestrial network node and the wireless device using the location of the wireless device and the second location; and use the first propagation time and the second propagation time to calculate the estimated signal time arrival difference.

5. The wireless device of claim 3, wherein to calculate the estimated signal time arrival difference, the wireless device is further configured to:

obtain a third propagation time between the first non-terrestrial network node and a first gateway through which the first non-terrestrial network node communicates with a core network;

obtain a fourth propagation time between the second non-terrestrial network node and a second gateway through which the second non-terrestrial network node communicates with the core network; and use the third propagation time and the fourth propagation time to calculate the estimated signal time arrival difference.

6. The wireless device of claim 3, wherein at least one of the first non-terrestrial network node and the second non-terrestrial network node is operated in a bent-pipe mode.

7. The wireless device of claim 3, wherein the wireless device is further configured to receive one or more satellite reference signals using the NTN-SMTC.

8. The wireless device of claim 3, wherein the wireless device is further configured to participate in a handover procedure from the first non-terrestrial network node to the second non-terrestrial network node using the NTN-SMTC.

9. The wireless device of claim 3, wherein at least one of the first non-terrestrial network node and the second non-terrestrial network node is a low-earth orbiting satellite, a medium-earth orbiting satellite, or a geostationary satellite.

10. The wireless device of claim 3 wherein to obtain the first location information and the second location information, the wireless device is further configured to obtain trajectory information associated with the first non-terrestrial network node and the second non-terrestrial network node.

11. The wireless device of claim 3, wherein to determine the location of the wireless device, the wireless device is further configured to use a global navigation satellite system.

12. The wireless device of claim 3, wherein the wireless device is further configured to indicate to the NTN that the wireless device is capable of calculating the estimated signal time arrival difference.

13. A first non-terrestrial network node for communication in a non-terrestrial network, NTN, comprising at least the first non-terrestrial network node and a second non-terrestrial network node, first non-terrestrial network node comprising:

a memory configured to store instructions; and processing circuitry configured to execute the instructions, wherein the network node is configured to:

obtain location information associated with a wireless device;

obtain first location information associated with the first non-terrestrial network node and second location information associated with the second non-terrestrial network node;

calculate an estimated signal time arrival difference based on the location information associated with the wireless device, the first location information, and the second location information;

signal the estimated signal time arrival difference to the wireless device and provide, to the wireless device, an NTN-specific synchronization signal/physical broadcast channel, SS/PBCH, block measurement timing configuration, NTN-SMTC;

wherein the NTN-SMTC is provided in response to receiving a request from the wireless device after the signaling of the estimated signal time arrival difference to the wireless device; and wherein the NTN-SMTC is used to detect one of the first non-terrestrial network node and the second non-terrestrial network node.

14. The first non-terrestrial network node of claim 13, wherein first non-terrestrial network node is further configured to:

determine a first propagation time between the non-terrestrial first network node and the wireless device using the location of the wireless device and the first location information;

determine a second propagation time between the second non-terrestrial network node and the wireless device using the location of the wireless device and the second location information; and use the first propagation time and the second propagation time to calculate the estimated signal time arrival difference.

15. The first non-terrestrial network node of claim 13, wherein first non-terrestrial network node is further configured to:

obtain a third propagation time between the first non-terrestrial network node and a first gateway through which the first non-terrestrial network node communicates with a core network;

obtain a fourth propagation time between the second non-terrestrial network node and a second gateway through which the second non-terrestrial network node communicates with the core network; and use the third propagation time and the fourth propagation time to calculate the estimated signal time arrival difference.

16. The first non-terrestrial network node of claim 13, wherein at least one of the first non-terrestrial network node and the second non-terrestrial network node is operated in a bent-pipe mode.

17. The first non-terrestrial network node of claim 13, wherein the NTN-SMTC enables the wireless device to receive one or more satellite reference signals.

18. The first non-terrestrial network node of claim 13, wherein the first non-terrestrial network node is further configured to participate in a procedure to handover the wireless device from the first non-terrestrial network node to the second non-terrestrial network node using the NTN-SMTC.

19. The first non-terrestrial network node of claim 13, wherein at least one of the first non-terrestrial network node and the second non-terrestrial network node is a low-earth orbiting satellite, a medium-earth orbiting satellite, or a geostationary satellite.

20. The first non-terrestrial network node of claim 13, wherein to obtain the first location information and the second location information, the first non-terrestrial network node is further configured to obtain trajectory information associated with the first non-terrestrial network node and the second non-terrestrial network node.

21. The first non-terrestrial network node of claim 13, wherein:

the first non-terrestrial network node and the second non-terrestrial network node are operated in a regenerative mode; and the estimated signal time arrival difference is further based on the synchronization between the first non-terrestrial network node and the second non-terrestrial network node.

* * * * *